(12) United States Patent
Leonard

(10) Patent No.: US 10,752,070 B2
(45) Date of Patent: Aug. 25, 2020

(54) CLAMPING PLATES AND GAS SPRING ASSEMBLIES AS WELL AS SUSPENSION SYSTEMS AND METHODS INCLUDING SAME

(71) Applicant: FIRESTONE INDUSTRIAL PRODUCTS COMPANY, LLC, Nashville, TN (US)

(72) Inventor: Joshua R. Leonard, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 14 days.

(21) Appl. No.: 15/737,913

(22) PCT Filed: Jun. 30, 2016

(86) PCT No.: PCT/US2016/040592
§ 371 (c)(1),
(2) Date: Dec. 19, 2017

(87) PCT Pub. No.: WO2017/004472
PCT Pub. Date: Jan. 5, 2017

(65) Prior Publication Data
US 2018/0297431 A1 Oct. 18, 2018

Related U.S. Application Data

(60) Provisional application No. 62/187,810, filed on Jul. 1, 2015.

(51) Int. Cl.
*F16F 9/04* (2006.01)
*B60G 11/27* (2006.01)
(Continued)

(52) U.S. Cl.
CPC .......... *B60G 11/27* (2013.01); *B60G 17/0424* (2013.01); *B60G 17/0521* (2013.01);
(Continued)

(58) Field of Classification Search
CPC .......... F16F 9/0472; F16F 9/049; F16F 9/057; F16F 9/0454; B60G 17/0485
See application file for complete search history.

(56) References Cited

U.S. PATENT DOCUMENTS 2,926,011 A   2/1960   Slemmons
3,212,769 A  10/1965   Ishibashi
(Continued)

FOREIGN PATENT DOCUMENTS

GB       1068167       5/1967
WO   WO 2014/194008   12/2014
(Continued)

OTHER PUBLICATIONS

International Search Report and Written Opinion dated Oct. 21, 2016 for corresponding International Patent Application No. PCT/US2016/040592.

*Primary Examiner* — Bradley T King
(74) *Attorney, Agent, or Firm* — Brian D. McAlhaney; Matthew P. Dugan

(57) ABSTRACT

A clamping plate is dimensioned to secure a flexible spring member to an end member for forming a gas spring assembly. The clamping plate includes a clamping plate wall with an axis and opposing surface portions oriented transverse to the axis. An opening extends into the clamping plate wall from along each of the opposing surface portions. An elongated damping passage extends in a spiral configuration through the clamping plate wall in fluid communication with the openings. A gas spring assembly includes a flexible spring member that defines a spring chamber, and an end
(Continued)

member with an end member wall that defines an end member chamber. The clamping plate is secured to the end member and retains the flexible spring member thereon. The elongated damping passage is in fluid communication between the spring chamber and the end member chamber. Gas transfer between the spring chamber and the end member chamber generates pressurized gas damping during use of the gas spring assembly. Suspension systems and methods are also included.

18 Claims, 32 Drawing Sheets

(51) Int. Cl.
 *B60G 17/04* (2006.01)
 *B60G 17/052* (2006.01)
(52) U.S. Cl.
 CPC ............ *F16F 9/049* (2013.01); *F16F 9/0454* (2013.01); *B60G 2202/242* (2013.01); *B60G 2204/126* (2013.01); *B60G 2500/2012* (2013.01)

(56) References Cited

U.S. PATENT DOCUMENTS

| | | |
|---|---|---|
| 4,506,910 A | 3/1985 | Bierens |
| 5,111,735 A | 5/1992 | Johnson |
| 5,954,316 A | 9/1999 | Voss |
| 6,312,006 B1 | 11/2001 | Svensson |
| 7,942,427 B2 | 5/2011 | Lloyd |
| 8,123,202 B2 | 2/2012 | Eise |
| 8,540,222 B2 | 9/2013 | Westnedge |
| 8,801,016 B2 | 8/2014 | Leonard |
| 9,140,327 B2 | 9/2015 | Hart |
| 2006/0226586 A1 | 10/2006 | Levy |
| 2007/0114706 A1 | 5/2007 | Myers |
| 2008/0284072 A1* | 11/2008 | Hayes .................... B60G 11/27 267/119 |
| 2009/0057967 A1 | 3/2009 | Koeske |
| 2011/0049774 A1 | 3/2011 | Naber |
| 2013/0175742 A1* | 7/2013 | Buttner ................. F16F 9/0454 267/64.27 |
| 2014/0252702 A1* | 9/2014 | Trowbridge ........... B60G 11/27 267/122 |
| 2014/0345450 A1 | 11/2014 | Leonard |
| 2016/0121682 A1* | 5/2016 | Leonard .................... F16F 9/04 280/124.161 |
| 2016/0298712 A1 | 10/2016 | Weber |
| 2017/0151848 A1 | 6/2017 | Delorenzis |
| 2017/0248187 A1* | 8/2017 | Leonard .................. F16F 9/049 |
| 2018/0304711 A1* | 10/2018 | Leonard .................... F16F 9/54 |
| 2018/0313424 A1* | 11/2018 | Leonard .................. F16F 9/049 |

FOREIGN PATENT DOCUMENTS

| | | |
|---|---|---|
| WO | WO2015/065989 | 5/2015 |
| WO | WO2016/168500 | 10/2016 |

* cited by examiner

CLAMPING PLATES AND GAS SPRING ASSEMBLIES AS WELL AS SUSPENSION SYSTEMS AND METHODS INCLUDING SAME

BACKGROUND

The subject matter of the present disclosure broadly relates to the art of gas spring devices and, more particularly, to gas spring assemblies that are capable of providing internal pressurized gas damping. Suspension systems including one or more of such gas spring assemblies as well as methods of manufacture are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Generally, it is possible to reduce the spring rate of gas springs, thereby improving ride comfort, by increasing the volume of pressurized gas operatively associated with the gas spring. This is commonly done by placing an additional chamber, cavity or volume filled with pressurized gas into fluid communication with the primary spring chamber of the gas spring.

The one or more damping elements can, in some cases, be of a type and kind that utilize gaseous fluid rather than liquid as the working medium. In known constructions, the pressurized gas damping element can permit gas flow between two or more volumes of pressurized gas, such as through one or more orifices or through one or more valve ports. Generally, there is some resistance to the movement of pressurized gas through these passages or ports. This resistance acts to dissipate energy associated with gas springs and/or suspension systems, and thereby provide some measure of damping.

However, various disadvantages exist with known gas spring constructions that include additional gas volumes to assist in reducing the spring rate of the gas spring, and at least some of these disadvantages involve the movement of air between the two volumes. That is, the flow of pressurized gas between the two volumes is at least partially dependent upon the size, length, shape and number of fluid pathways connecting the two volumes. It will be appreciated that one or more, very large, fluid-communication pathways would permit increased quantities of pressurized gas to flow between the two volumes. However, such pathways would provide reduced resistance to gas flow and, thus, provide minimal or at least decreased damping characteristics. What's more, such very large pathways are often difficult to provide, given the limited operating and mounting envelopes normally associated with vehicle suspension systems.

Increased damping performance can, in some cases, be achieved by reducing the size, increasing the length, altering the shape and/or reducing the number of fluid pathways between the two volumes. Such alterations would, however, normally provide increased damping performance at the expense of other performance characteristics of the gas spring assemblies. That is, the changes that increase the resistance to flow through the passages and, thus, increase damping performance will typically also decrease the effectiveness of the additional gas volume in reducing the spring rate of the gas spring.

Notwithstanding the overall success of known constructions, certain disadvantages may still exist that could be limiting to broader adoption and/or use of gas spring devices. Accordingly, it is believed desirable to develop gas spring devices that overcome the foregoing and/or other problems or disadvantages of known designs, and/or otherwise advance the art of gas spring devices.

BRIEF DESCRIPTION

One example of a clamping plate in accordance with the subject matter of the present disclosure is dimensioned to secure an associated flexible spring member to an associated end member for forming an associated gas spring assembly. The clamping plate can have a longitudinal axis and can include a clamping plate wall extending radially outward from the longitudinal axis. The clamping plate wall can have a first end surface portion disposed along a first side of the clamping plate and a second end surface portion disposed along a second side of the clamping plate that is longitudinally spaced from the first side and facing opposite the first end surface portion. An outer peripheral surface portion can extend between and operatively connect the first and second end surface portions. The outer peripheral surface portion can at least partially define an outermost cross-sectional dimension of the clamping plate and can be dimensioned to abuttingly engage the associated flexible spring member for urging the associated flexible spring member into a substantially fluid-tight seal with the associated end member for forming the associated gas spring assembly. The clamping plate wall can include a passage surface portion that at least partially forms an elongated damping passage extending through the clamping plate. The clamping plate wall can include a first opening accessible from along the first end surface portion and a second opening accessible from along the second end surface portion. The elongated damping passage extending in a spiral configuration in fluid communication from the first opening to the second opening such that the elongated damping passage has an overall length substantially greater than the outermost cross-sectional dimension of the clamping plate.

In some cases, a clamping plate according to the foregoing paragraph can have a passage surface portion that has an approximately U-shaped cross-sectional configuration. In such cases, the elongated damping passage can take the form of an open channel that is accessible from along the second side of the clamping plate.

One example of a gas spring assembly in accordance with the subject matter of the present disclosure can include a flexible spring member that has a longitudinal axis. The flexible spring member can extend between opposing first and second ends, and can include a flexible wall that extends peripherally about the axis to at least partially define a spring chamber. The gas spring assembly can also include a first end member that can include at least one end member wall that at least partially defines an end member chamber. An opening can extend through the end member wall such that the spring chamber and the end member chamber can fluidically communicate with one another through the opening. The gas spring assembly can further include a clamping plate having an outermost cross-sectional dimension. The clamping plate can be disposed in operative engagement with the first end of the flexible spring member and can be secured to the first end member such that a substantially fluid-tight seal is formed between the flexible spring member and the first end member. The clamping plate can include a clamping plate wall that has a first surface portion disposed along a first side of the clamping plate and a second surface portion disposed along a second side of the clamping plate that is opposite the first side such that the second surface portion faces opposite the first surface portion. The clamping plate wall can include a first opening accessible from along the first surface portion and a second opening accessible from along the second surface portion. The clamping plate includes an elongated damping passage that extends within the clamping plate wall in a spiral configuration in fluid communication with the first and second openings such that the elongated damping passage has an overall length substantially greater than the outermost cross-sectional dimension of the clamping plate. The clamping plate is oriented such that the first side is disposed toward the spring chamber and the second side is disposed toward the first end member. The first opening of the clamping plate is disposed in fluid communication with the spring chamber and the second opening of the clamping plate is disposed in fluid communication with the opening in the end member wall such that gas transfer between the spring chamber and the end member chamber through the elongated damping passage can generate pressurized gas damping during use of the gas spring assembly.

In some cases, a gas spring assembly according to the foregoing paragraph can include a clamping plate with a passage surface portion that at least partially defines the elongated damping passage. The passage surface portion can have an approximately U-shaped cross-sectional configuration such that the elongated damping passage takes the form of an open channel that is open along the second side of the clamping plate.

In some cases, a gas spring assembly according to the foregoing paragraph can include a substantially fluid-tight seal formed between the second surface portion of the clamping plate wall and the end member wall to substantially enclose the elongated damping passage between the first and second openings of the clamping plate.

In some cases, a gas spring assembly according to any one of the foregoing three paragraphs can include a second end member connected across the second end of the flexible spring member such that a substantially fluid tight seal is formed therebetween. The second end member can include an end member wall that at least partially defines a second end member chamber and includes an opening extending through the end member wall such that the spring chamber and the second end member chamber are disposed in fluid communication with one another.

One example of a suspension system in accordance with the subject matter of the present disclosure can include a pressurized gas system that includes a pressurized gas source and a control device. The suspension system can also include at least one gas spring assembly according to the foregoing paragraph. The at least one gas spring assembly can be disposed in fluid communication with the pressurized gas source through the control device such that pressurized gas can be selectively transferred into and out of the spring chamber.

One example of a method of manufacturing a gas spring assembly in accordance with the subject matter of the present disclosure can include providing a flexible spring member having a longitudinal axis. The flexible spring member can include a flexible wall extending longitudinally between first and second ends, and peripherally about the axis to at least partially define a spring chamber. The method can also include providing an end member that includes an end member wall that at least partially defines an end member chamber. An opening can extend through the end member wall such that the spring chamber and the end member chamber can fluidically communicate therethrough. The method can further include positioning the first end of the flexible spring member along the end member. The method can also include providing a clamping plate that has an outermost cross-sectional dimension and that includes a clamping plate wall with a first surface portion, a second surface portion facing opposite the first surface portion and an outer peripheral surface portion extending between and operatively connecting the first and second surface portions. The clamping plate also including a passage surface portion that at least partially defines an elongated damping passage extending in a spiral configuration within the clamping plate wall from a first passage end to a second passage end such that the elongated damping passage has an overall length substantially greater than the outermost cross-sectional dimension of the clamping plate. The method further includes positioning the clamping plate across the first end of the flexible spring member such that a substantially fluid-tight seal is formed between the flexible spring member and the end member with the first passage end disposed in fluid communication with the spring chamber and the second passage end disposed in fluid communication with the end member chamber through the opening in the end member wall.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
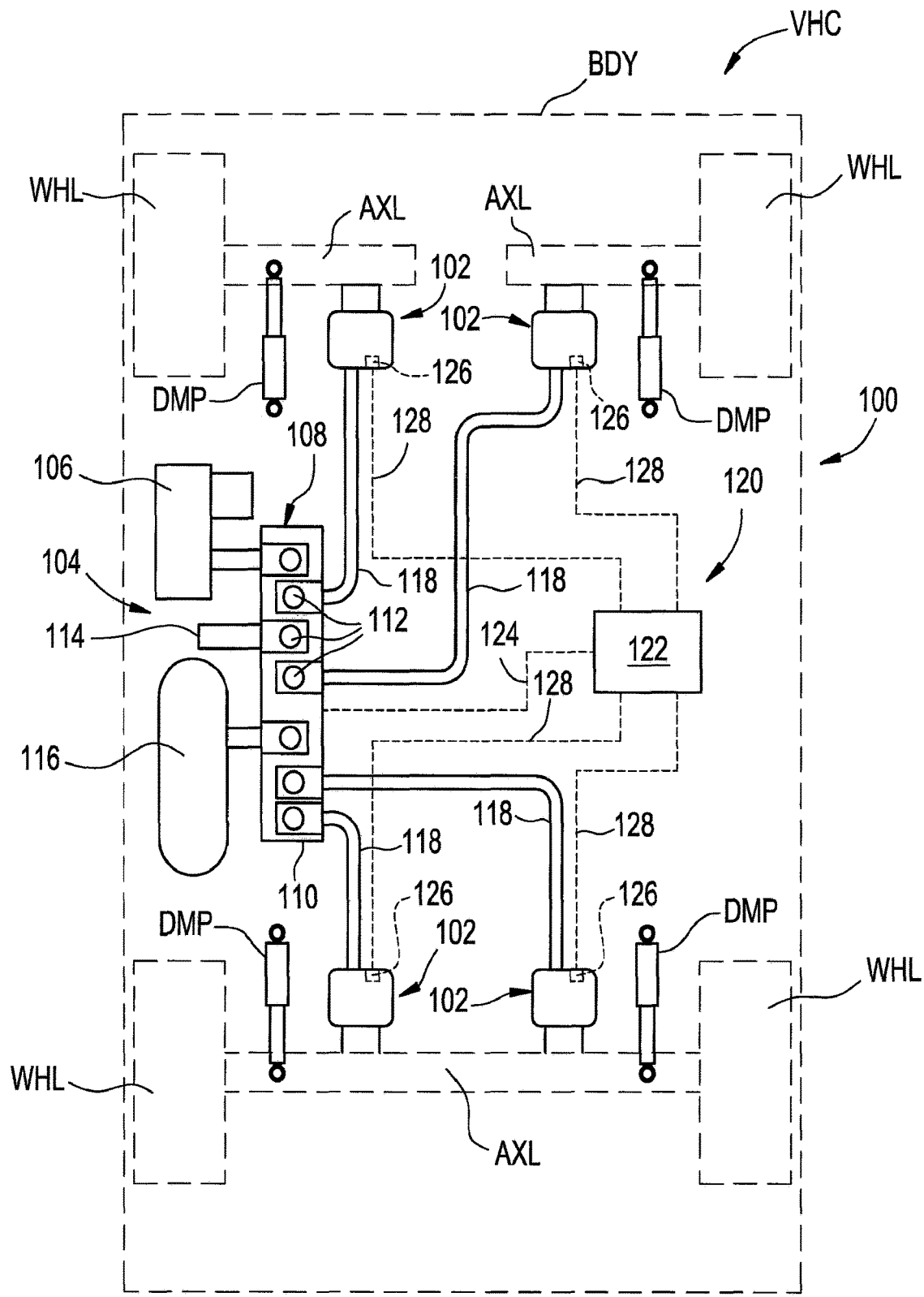
FIG. 1 is a schematic representation of one example of a suspension system of an associated vehicle that includes gas spring assemblies in accordance with the subject matter of the present disclosure.
Figure 2:
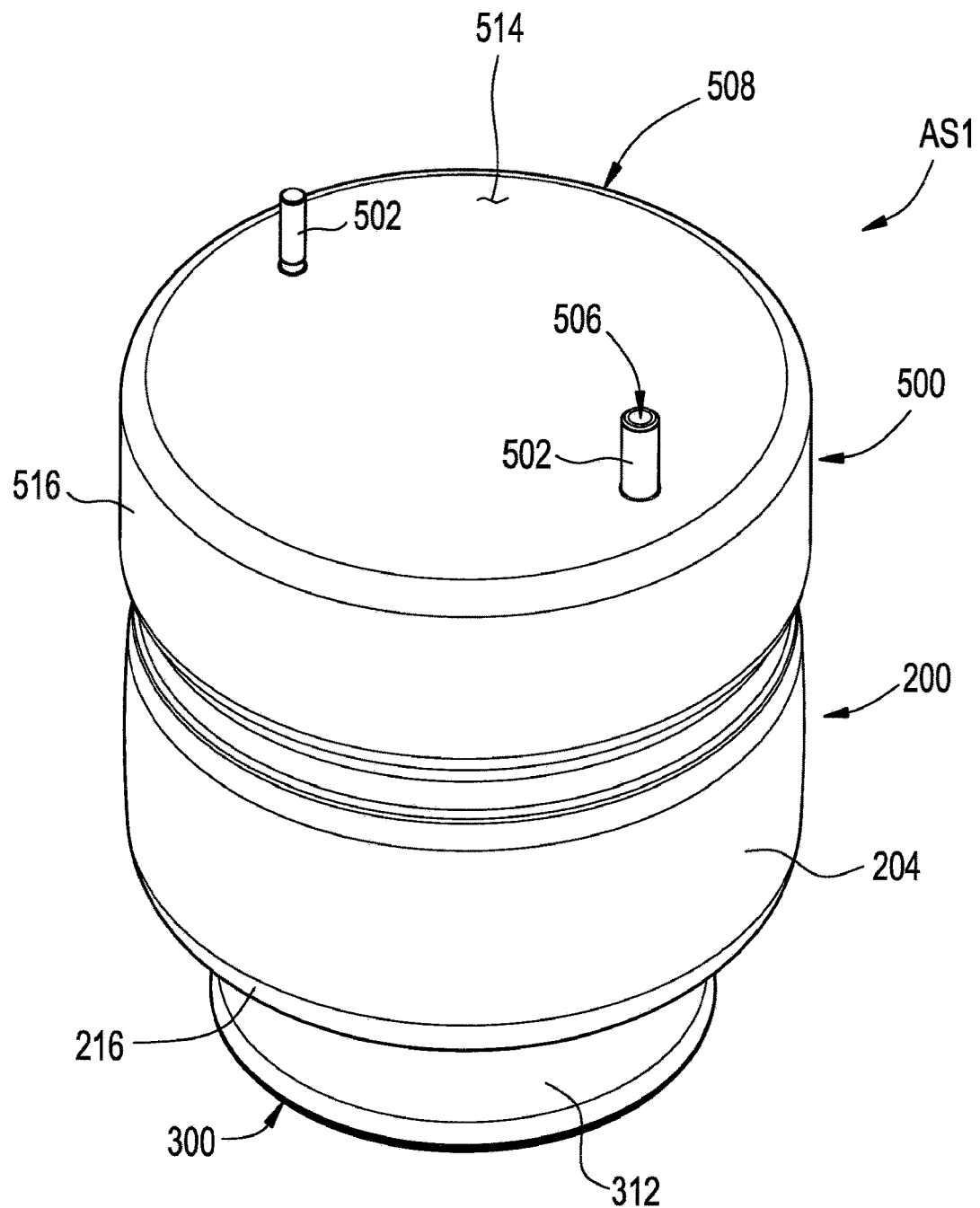
FIG. 2 is a top perspective view of one example of a gas spring assembly in accordance with the subject matter of the present disclosure.
Figure 3:
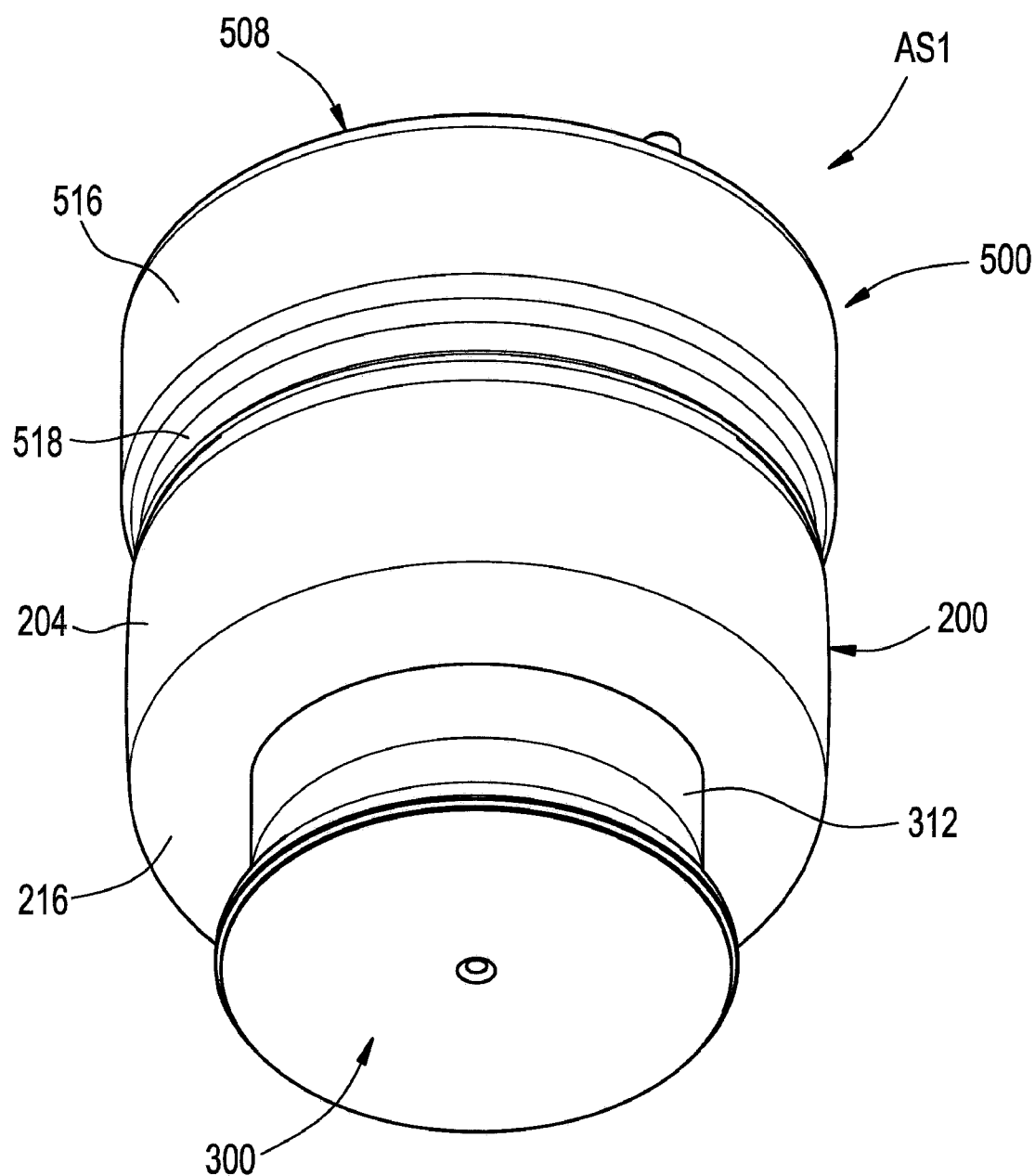
FIG. 3 is a bottom perspective view of the exemplary gas spring assembly in FIG. 2.
Figure 4:
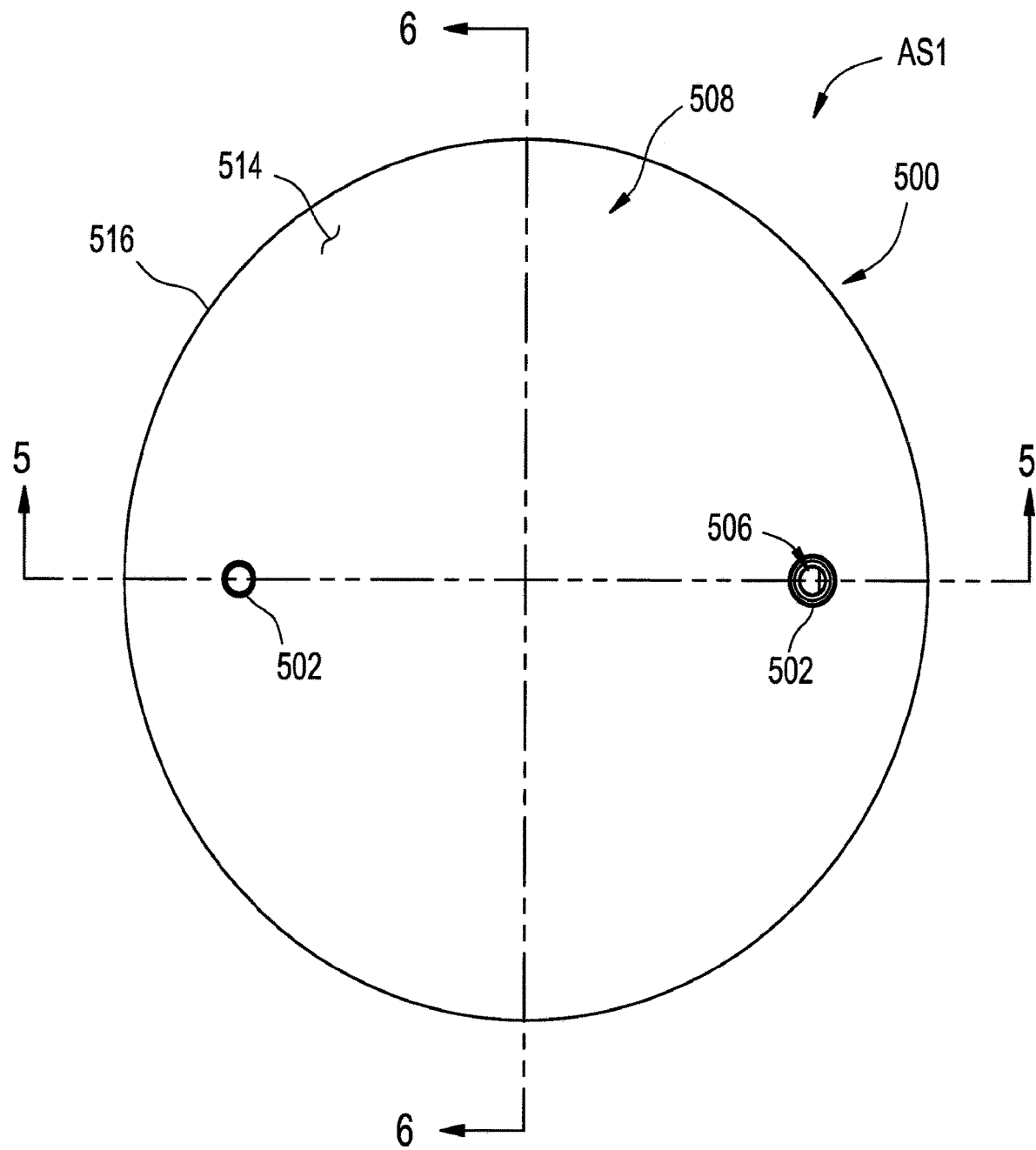
FIG. 4 is a top plan view of the exemplary gas spring assembly in FIGS. 2 and 3.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

For example, suspension system 100 can include a plurality of gas spring assemblies 102 in accordance with the subject matter of the present disclosure that are supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration and/or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Depending on desired performance characteristics and/or other factors, the suspension system may, in some cases, include damping members, such as dampers DMP, for example, of a typical construction that are provided separately from gas spring assemblies 102, and secured between the sprung and unsprung masses in a conventional manner. In a preferred arrangement, however, gas spring assemblies 102 are capable of providing pressurized gas damping, and can be sized, configured and operative to provide the desired performance characteristics for the suspension system without the use of additional damping members (e.g., conventional struts or shock absorbers) that are separately provided.

Suspension system 100 also includes a pressurized gas system 104 operatively associated with the gas spring assemblies for selectively supplying pressurized gas (e.g., air) thereto and selectively transferring pressurized gas therefrom. In the exemplary arrangement shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also, optionally, include a suitable exhaust, such as a muffler 114, for example, for venting pressurized gas from the system. Optionally, pressurized gas system 104 can also include a reservoir 116 in fluid communication with compressor 106 and/or valve assembly 108, and suitable for storing pressurized gas at an elevated pressure (i.e., greater than atmospheric pressure) for an extended period of time, such as minutes, hours, days or weeks, for example.

Valve assembly 108 is in communication with gas spring assemblies 102 through suitable gas transfer lines 118. As such, pressurized gas can be selectively transferred into and/or out of the gas springs assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction, such as may operate using sound, pressure, light and/or electromagnetic waves, for example.

Having described an example of a suspension system (e.g., suspension system 100) that can include gas spring assemblies in accordance with the subject matter of the present disclosure (e.g., gas spring assemblies 102), one example of such a gas spring assembly will now be described in connection with FIGS. 2-6. As shown therein, a gas spring assembly AS1, such as may be suitable for use as one or more of gas spring assemblies 102 in FIG. 1, for example, is shown as having a longitudinal axis AX (FIG. 6) and including a flexible spring member 200. Gas spring assembly also includes an end member (or end member assembly) 300 that is secured to the flexible spring member by way of a clamping plate 400. Gas spring assembly AS1 also includes an end member (or end member assembly) 500 that is secured to the flexible spring member in a suitable manner in spaced relation to end member 300. Flexible spring member 200 can be secured one or along end members in a substantially fluid-tight manner such that a spring chamber 202 (FIGS. 5 and 6) is at least partially defined by the flexible spring member between the end members.

Figure 6:
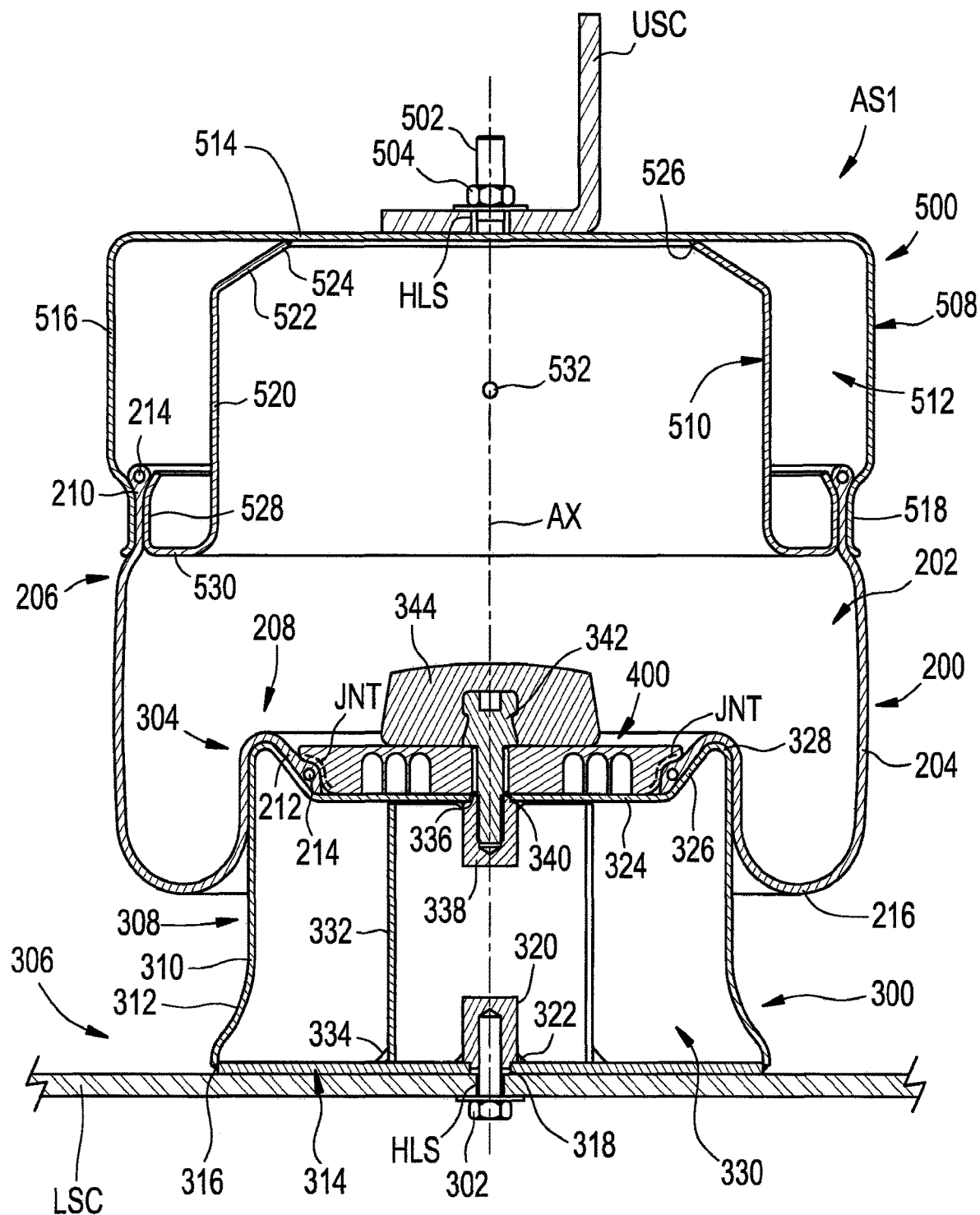
FIG. 6 is a cross-sectional side view of the exemplary gas spring assembly in FIGS. 2-5 taken from along line 6-6 in FIG. 4.
Figure 7:
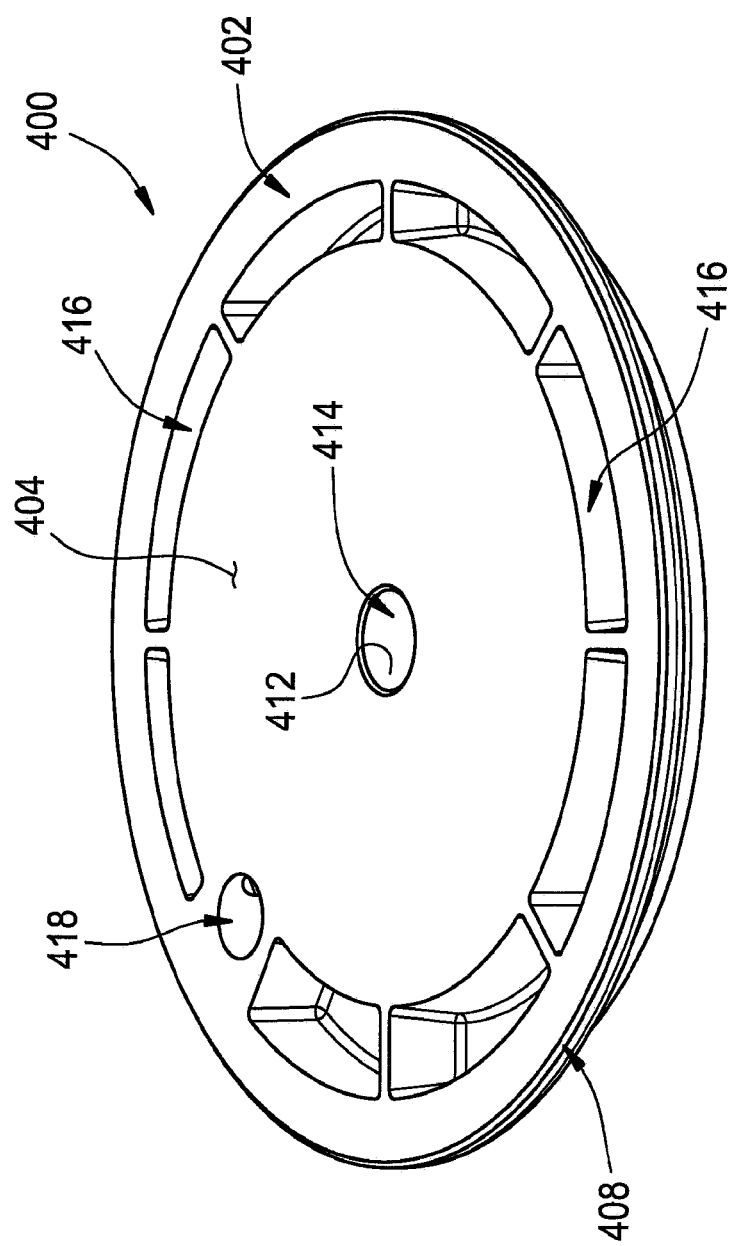
FIG. 7 is a top perspective view of one example of a clamping plate in accordance with the subject matter of the present disclosure, such as may be suitable for use in connection with the gas spring assemblies in FIGS. 1-6.
Figure 8:
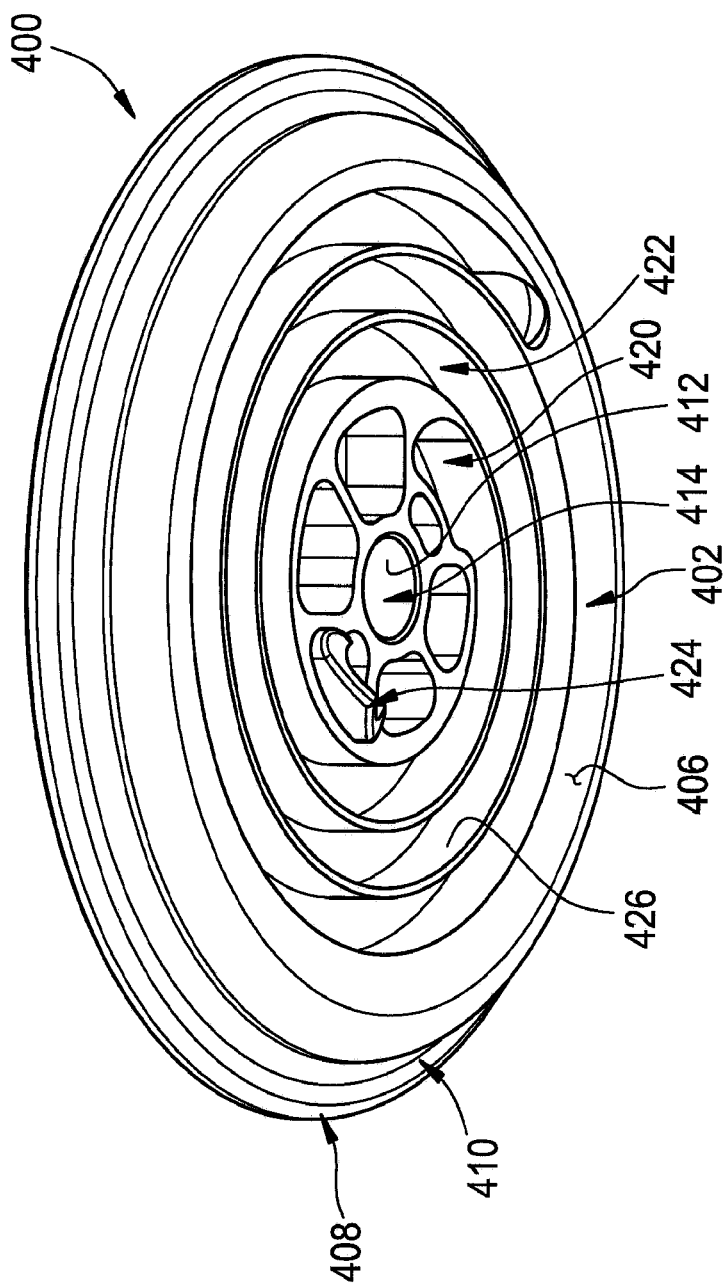
FIG. 8 is a bottom perspective view of the exemplary clamping plate in FIG. 7.
Figure 9:
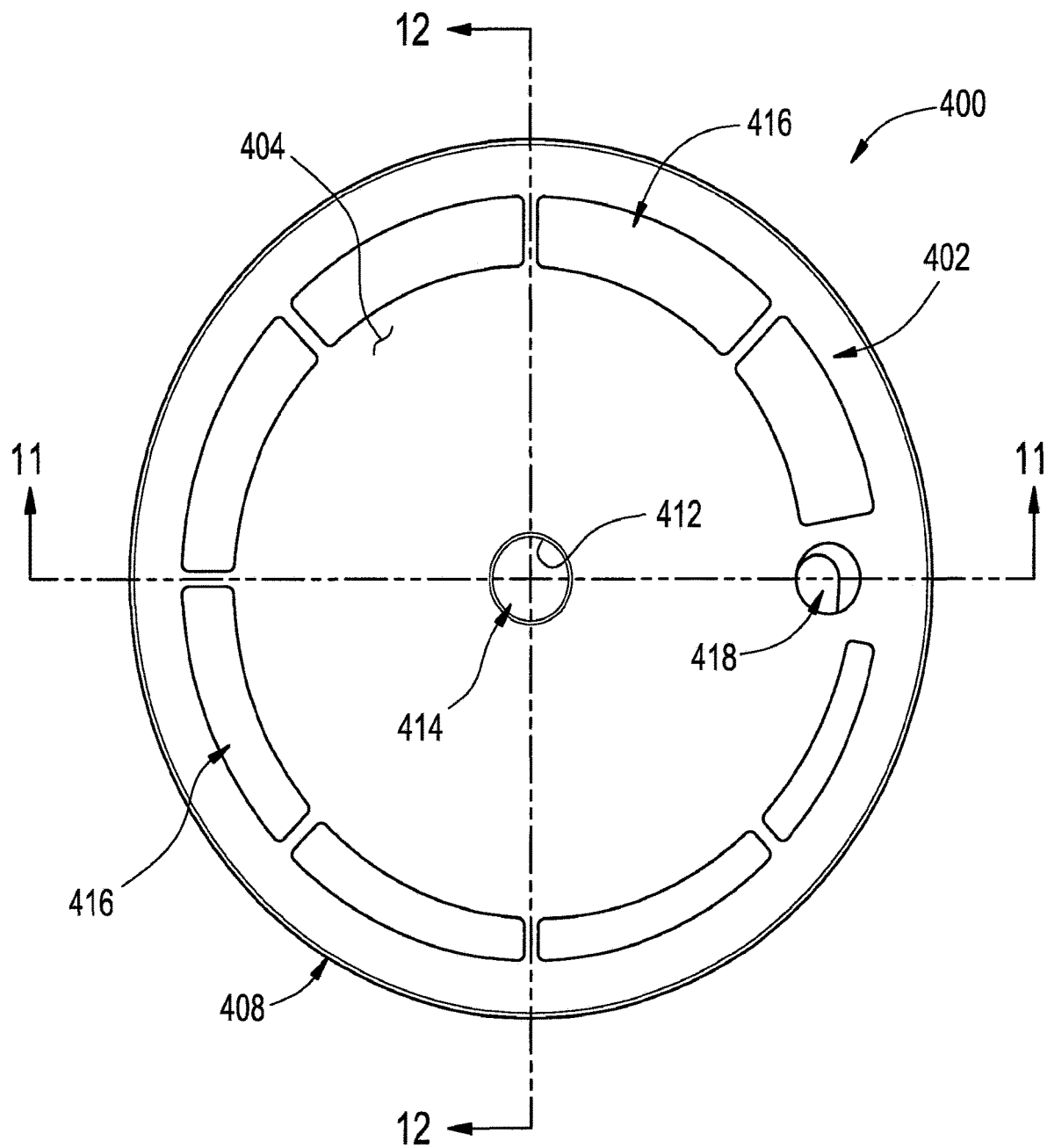
FIG. 9 is a top plan view of the exemplary clamping plate in FIGS. 7 and 8.
Figure 10:
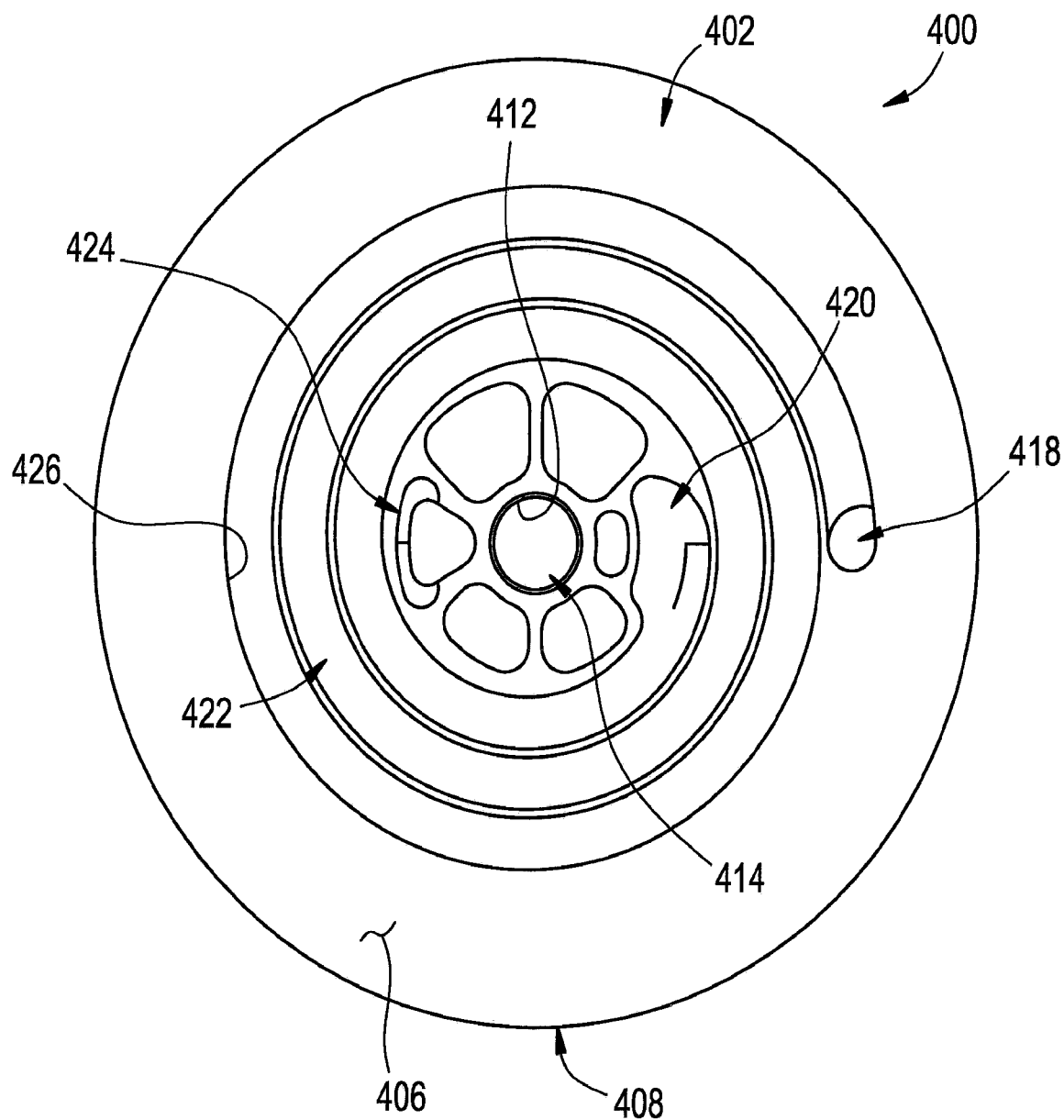
FIG. 10 is a bottom plan view of the exemplary clamping plate in FIGS. 7-9.

Gas spring assembly AS1 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIG. 6, for example, end member 500 can be secured on or along a first or upper structural component USC, such as associated vehicle body BDY in FIG. 1, for example, and can be secured thereon in any suitable manner. For example, one or more securement devices, such as mounting studs 502, for example, can be included along end member 500. In some cases, the one or more securement devices (e.g., mounting studs 502) can project outwardly from end member 500 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 504 or other securement devices, for example. As an alternative to one or more of mounting studs 502, one or more threaded passages (e.g., blind passages and/or through passages) could be used in conjunction with a corresponding number of one or more threaded fasteners, such as are illustrated in FIGS. 13-25, for example.

Additionally, one or more fluid communication ports, such as transfer passages 506 (FIG. 5), for example, can, optionally, be provided to permit fluid communication with spring chamber 202, such as may be used for transferring pressurized gas into and/or out of the spring chamber, for example. In the exemplary embodiment shown, transfer passages 506 extend through at least one of mounting studs 502 and are in fluid communication with spring chamber 202. It will be appreciated, however, that any other suitable fluid communication arrangement could alternately be used.

End member assembly 300 can be secured on or along a second or lower structural component LSC, such as an axle AXL in FIG. 1, for example, in any suitable manner. As one example, lower structural component LSC could include one or more mounting holes HLS extending therethrough. In such case, a threaded fastener 302 (FIG. 6) could extend through one of mounting holes HLS and threadably engage end member 300 or another component of the assembly to secure the end member on or along the lower structural component.

Flexible spring member 200 can be of any suitable size, shape, construction and/or configuration. As one example, flexible spring member 200 can include a flexible wall 204 that is at least partially formed from one or more layers or plies of elastomeric material (e.g., natural rubber, synthetic rubber and/or thermoplastic elastomer) and can optionally include one or more plies or layers of filament reinforcing material (not shown). Flexible wall 204 is shown extending in a longitudinal direction between opposing ends 206 and 208. In some cases, flexible spring member 200 can, optionally, include a mounting bead disposed along either one or both of ends 206 and 208 of the flexible wall. In the arrangement shown in FIGS. 5 and 6, for example, mounting beads 210 and 212 are shown as being respectively disposed along ends 206 and 208. In some cases, the mounting beads can, optionally, include a reinforcing element, such as an endless, annular bead wire 214, for example.

End member 300 extends longitudinally between a first or upper end 304 and a second or lower end 306. First end 304 is adapted to receivingly engage end 208 of flexible spring member 200. Second end 306 of end member 300 is adapted to abuttingly engage an associated structural component, such as has been described above in connection with lower structural component LSC, for example.

End member 300 includes an end member body or shell 308 and can also, optionally, include one or more additional components and/or elements. End member body 308 has a first or outer side wall (or wall portion) 310 that extends generally longitudinally between first and second ends 304 and 306. In an assembled condition and during use, a portion of flexible spring member 200 forms a rolling lobe 216 that is displaced along an outer surface (or surface portion) 312 of outer side wall 310 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of gas spring end members. As such, it will be appreciated that the profile of outer surface 312 of outer side wall 310 is merely exemplary.

End member 300 can also include an end member base 314 that is received within or otherwise disposed along an open end (not numbered) of end member shell 308 along end 306 of end member 300. End member base 314 can be secured on or along end member shell 308 in any suitable manner, such as, for example, by welding the end member base and the end member shell together, as indicated by all-around flowed-material joint 316, for example. A mounting hole 318 can, optionally, extend through end member base 314. Threaded inserts 320 can be secured, such as by flowed-material joints 322, for example, on end member base 314 adjacent mounting hole 318. Additionally, structural member holes HLS can optionally be provided, such as, for example, may be disposed in alignment with the mounting hole of the threaded insert that is dimensioned to receive a suitable fastener (e.g., threaded fastener 302).

Outer side wall 310 of end member shell 308 extends generally longitudinally between first and second ends 304 and 306. End member shell 308 also includes an end wall (or end wall portion) 324 that is disposed radially inward of outer side wall 310. End wall 324 can be operatively connected to outer side wall 310 in any suitable manner. For example, end member shell 308 can include a frustoconical wall (or wall portion) 326 disposed radially outward of end wall 324. End member shell 308 can also include a shoulder wall (or wall portion) 328 that extends between and operatively connects outer side wall 310 and frustoconical wall 326 such that end 304 of end member 300 has a somewhat dish-shaped configuration that is dimensioned to receive a portion of flexible spring member 200 and at least a portion of clamping plate 400. It will be appreciated, however, that other configurations and/or arrangements could alternately be used.

End member shell 308 and end member base 314 together at least partially define an end member chamber 330 within end member 300. In some cases, an inner support wall (or wall portion) 332 can, optionally, be provided that extends generally longitudinally between end wall 324 of end member shell 308 and end member base 314. It will be appreciated that inner support wall 332, if provided, can be secured on or along end wall 324 and/or end member base 314 in a suitable manner, such as by way of one or more flowed-material joint 334. One or more passage and/or openings (not identified) can be included on or between inner support wall 332 and the end wall of the end member shell and/or the end member base to permit the portions of end member chamber 330 inside and outside of inner support wall 332 to be in fluid communication with one another.

As mentioned above, the end member can be secured on or along an associated structural component, such as lower structural component LSC, for example, in any suitable manner and through the use of any suitable combination of components. Similarly, clamping plate 400 can be secured on or along end member 300 in any suitable manner and through the use of any suitable combination of components. For example, a mounting hole 336 can, optionally, extend through end wall 324. A threaded insert 338 can be secured on or along end wall 324 in communication with the mounting hole, such as by way of a flowed material joint 340, for example. In such case, a bumper mount 342 can extend through clamping plate 400 and into engagement with threaded insert 336. Bumper mount 342 can be threadably engaged with threaded insert 338 such that clamping plate 400 and/or a portion of flexible spring member 200 (e.g., mounting bead 212) can be secured in a substantially fluid-tight arrangement with end member shell 308. In a preferred arrangement, a portion of bumper mount 342 will extend axially outwardly beyond clamping plate 400 and project into spring chamber 202. In such case, a jounce bumper 344 of any suitable type, kind, construction and/or configuration can be received on bumper mount 342 and/or otherwise secured within spring chamber 202 of gas spring assembly AS1.

End member chamber 330 can be disposed in fluid communication with spring chamber 202 such that gas transfer between the spring chamber and the end member chamber can generate pressurized gas damping during use of a gas spring assembly in accordance with the subject matter of the present disclosure (e.g., gas spring assembly AS1). As such, end member shell 308 can include one or more holes and/or passages extending through one or more walls (or wall portions) thereof and through which spring chamber 202 and end member chamber 330 can fluidically communicate with one another. As one example, end member shell 308 includes a passage or opening 346 (FIG. 5) extending through end wall 324. In a preferred arrangement, opening 346 will be disposed in fluid communication with an elongated damping passage extending through clamping plate 400. In such case, it may be desirable to provide one or more alignment and/or indexing features on or along end member shell 308. As one example, end member shell 308 can include a hole or opening 348 (FIG. 5) extending through end wall 324 in a predetermined angular orientation relative to opening 346. Additionally, or as an alternative, one or more projections could be included on or along the end wall of the end member shell.

Figure 5:
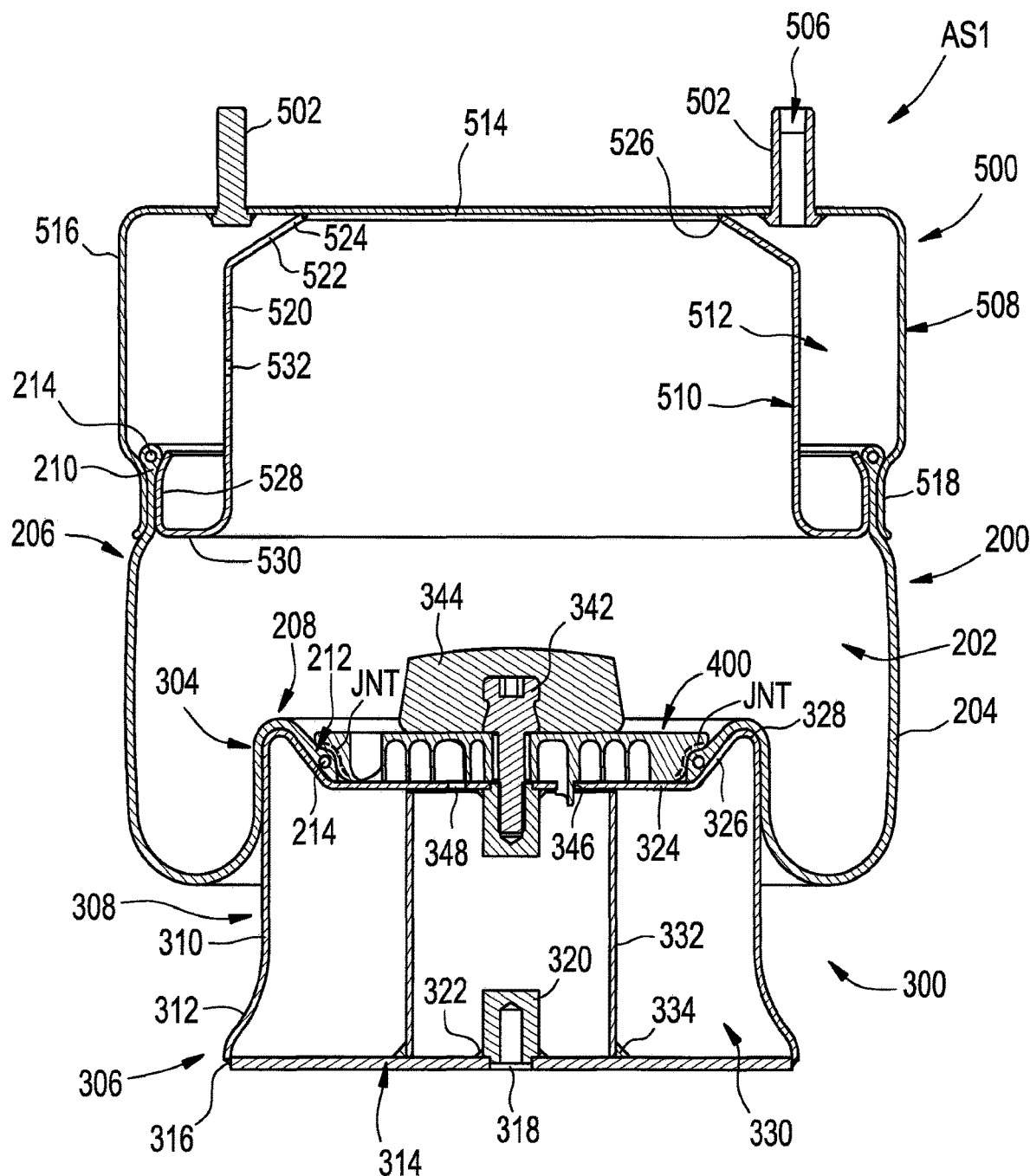
FIG. 5 is a cross-sectional side view of the exemplary gas spring assembly in FIGS. 2-4 taken from along line 5-5 in FIG. 4.

With reference, now, to FIGS. 5 and 6 as well as FIGS. 7-12, clamping plate 400 is shown as including a clamping plate wall 402 that extends around and radially outward from axis AX in transverse relation thereto. Clamping plate wall 402 includes a surface (or surface portion) 404 disposed along one side of clamping plate 400 and a surface (or surface portion) 406 disposed along another side of clamping plate 400. In a preferred arrangement, surfaces 404 and 406 can be approximately planar, and/or surface 406 can be shaped cooperatively with end wall 324 of end member shell 308. Clamping plate wall 402 also includes an outer peripheral surface (or surface portion) 408 that extends axially between and operatively connects surfaces 404 and 406.

Figure 11:
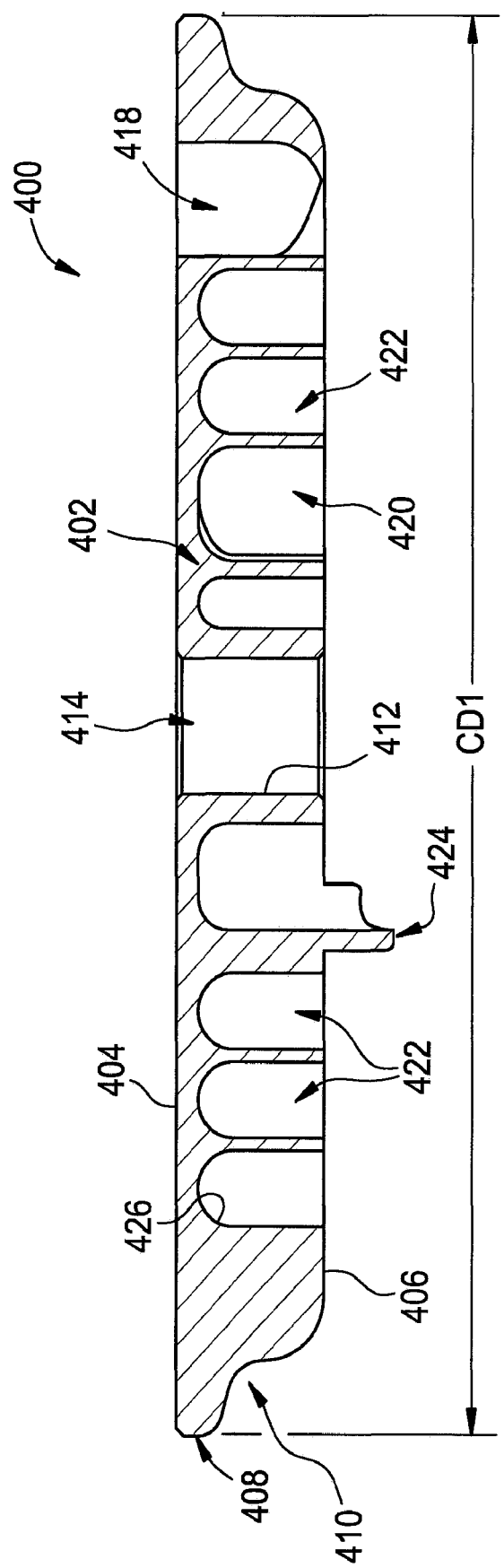
FIG. 11 is a cross-sectional side view of the exemplary clamping plate in FIGS. 7-10 taken from along line 11-11 in FIG. 9.

It will be appreciated that outer peripheral surface 408 can be of any suitable size, shape and/or configuration. For example, outer peripheral surface 408 can be curved or otherwise non-linear, and can at least partially define an annular recess 410 formed along the outer periphery of the clamping plate wall. In some cases, annular recess 410, if provided, can be dimensioned to receive at least a portion of mounting bead 212 of flexible spring member 200, such as is shown in FIGS. 5 and 6, for example. Regardless of the shape and/or configuration of clamping plate wall 402 and outer peripheral surface 408 thereof, it will be appreciated that clamping plate 400 will have an outermost cross-sectional dimension (e.g., a diameter) that extends generally thereacross, such as is represented in FIG. 11 by reference dimension CD1, for example.

As discussed above, clamping plate 400 can be secured on or along end member 300 in any manner suitable for urging a portion (e.g., mounting bead 212) of flexible spring member 200 into abutting engagement with a wall or wall portion (e.g., frustoconical wall 326) of end member 300. As one example, bumper mount 342 can be used to secure the clamping plate on end member 300, as discussed above. In such case, clamping plate wall 402 can include a passage surface (or surface portion) 412 that at least partially defines a hole or passage 414 extending through clamping plate 400. In a preferred arrangement, hole 414 is dimensioned to receive at least a portion of bumper mount 342 such that the same can extend through hole 414 and engage threaded insert 338. In some cases, a surface or shoulder (not numbered) of bumper mount 342 can abuttingly engage surface 404 of clamping plate wall 402. One or more additional features and/or elements can, optionally, be included on or along surface 404. For example, a plurality of recesses 416 can extend into clamping plate wall 402 from along surface 404. Recesses 416 are shown as being disposed in peripherally spaced relation to one another about axis AX. The recesses are also shown as being spaced radially outward from the axis toward outer peripheral surface 408 and varying in size and shape relative to one another.

Clamping plate 400 includes an opening or port 418 that extends into clamping plate wall 402 and is accessible from along surface 404. Clamping plate 400 also includes an opening or port 420 that extends into clamping plate wall 402 and is accessible from along surface 406. In the construction shown in FIGS. 5-12, opening 418 is disposed in a radially outward position that is adjacent or otherwise toward outer peripheral surface 408, and opening 420 is disposed in a position that is radially inward of opening 418 and generally toward axis AX.

As indicated above, a gas spring assembly in accordance with the subject matter of the present disclosure can include one or more elongated gas damping passages fluidically connected between the spring chamber and one or more end member chambers. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

A gas spring assembly in accordance with the subject matter of the present disclosure can include an elongated gas damping passage in fluid communication between the spring chamber and one or more end member chambers (e.g., end member chamber 330). Differential pressure between the spring chamber and the one or more end member chambers can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

Also, as discussed above, a gas spring assembly in accordance with the subject matter of the present disclosure can include a combination of features and/or components suitable for generating pressurized gas damping at two or more predetermined or targeted frequencies or otherwise within two or more predetermined or otherwise targeted ranges of frequencies. For example, it will be appreciated that the combination of spring chamber, one or more end member chambers, elongated gas damping passage or passages and/or any additional control devices can generate pressurized gas damping having a peak loss stiffness at approximately 2.5 Hz or within a range of from approximately 1-4 Hz and/or a peak loss stiffness at approximately 10 Hz or within a range of from approximately 8-12 Hz, which can respectively correspond to or otherwise represent targeted frequencies or targeted ranges of frequencies for vibration damping.

The combination of cross-sectional area and overall length of the elongated gas damping passage can be dimensioned, sized and/or otherwise configured to generate gas flow having sufficient mass and sufficient velocity to achieve the desired level of pressurized gas damping. Generally, a gas spring assembly in accordance with the subject matter of the present disclosure can include an elongated gas damping passage that has an overall length that is at least (10) times the maximum dimension (either actual or as a diametric equivalent) of the cross-sectional shape (e.g., the diameter of a circular passage) of the elongated gas damping passage. In a preferred arrangement, the overall length of the elongated gas damping passage will be at least twenty (20) times the maximum dimension of the cross-sectional shape. In some cases, the overall length of the elongated gas damping passage can be at least fifty (50) times the maximum dimension of the cross-sectional shape of the elongated gas damping passage. In other cases, the overall length of the elongated gas damping passage can be at least one hundred (100) times the maximum dimension of the cross-sectional shape of the elongated gas damping passage. Non-limiting examples of suitable ranges for dimensions of an elongated gas damping passage in accordance with the subject matter of the present disclosure can include an inside cross-sectional dimension (e.g., inside diameter) within a range of from approximately five (5) millimeters to approximately fifty (50) millimeters and an overall length of from approximately one-half (0.5) meter to approximately five (5) meters.

It will be appreciated that the aforementioned maximum dimension of the cross-sectional shape of the elongated gas damping passage can be either actual or a theoretical equivalent dimension. For example, an actual diameter of a circular passage, a major diameter of an elliptical passage or a height or width of a rectangular passage could be used. For non-circular and/or irregularly-shaped passages, a theoretical equivalent maximum dimension could be used.

In accordance with the subject matter of the present disclosure, such an elongated damping passage can be provided on or along an end member or clamping plate of the gas spring assembly. For example, clamping plate 400 can further include an elongated damping passage 422 extending through clamping plate wall 402. In a preferred arrangement, elongated damping passage 422 has a first end (not numbered) disposed in fluid communication with opening 418 and a second end (not numbered) disposed in fluid communication with opening 420. In a preferred arrangement, elongated damping passage 422 can have an overall length that is at least approximately one and one-half (1½) times the outermost cross-sectional dimension of clamping plate 400, such as is represented by reference dimension CD1, for example. In a preferred arrangement, the overall length of elongated damping passage is at least approximately two (2) times the outermost cross-sectional dimension of clamping plate 400 and, more preferably, at least approximately four (4) times the outermost cross-sectional dimension of clamping plate 400. In this manner, an elongated damping passage having an overall length that is substantially greater than the outermost cross-sectional dimension of the clamping plate can be used.

Utilizing such a construction, clamping plate 400 can secure flexible spring member 200 on or along end member 300 while generating pressurized gas damping as pressurized gas flows between spring chamber 202 and end member chamber 330 through elongated damping passage 422 and openings 418 and 420. In a preferred arrangement, clamping plate 400 is oriented relative to end member 300 such that opening 420 is disposed in fluid communication with opening 346 of end member shell 308. As such, it may be desirable to provide one or more alignment and/or indexing features on or along clamping plate wall 402. As one example, clamping plate wall 402 can include a projection 424 extending axially outwardly from along surface 406 in a predetermined angular orientation relative to opening 420. Additionally, or as an alternative, one or more holes or openings could be included on or along the clamping plate wall of the clamping plate. Cooperative engagement of an alignment or indexing feature (e.g., projection 424) of clamping plate 400 with an alignment or indexing feature (e.g., opening 348) of end member 300 can aid in assembly and assist in ensuring that openings 346 and 420 are at least approximately aligned and in fluid communication with one another.

Clamping plate wall 402 can include a passage surface 426 that at least partially defines elongated damping passage 422. It will be appreciated that passage surface 426 can have any suitable cross-sectional shape and/or profile. Elongated damping passage 422 is shown as having a spiral-like configuration. Such a spiral-like or similar configuration can be generated in any suitable manner. For example, the cross-sectional profile of passage surface 426 can be oriented transverse to axis AX and can be substantially-continuously rotated about the axis with the cross-sectional profile substantially-continuously displaced radially outward from adjacent axis AX to form the spiral-like configuration. In a preferred arrangement, such rotation of the cross-sectional profile of passage surface 426 can occur in an approximately single plane such that the spiral-like configuration of elongated damping passage 422 is disposed in a common plane that is oriented transverse to longitudinal axis AX.

In some cases, the cross-sectional profile of passage surface 426 can be endless or otherwise fully enclosed. In such cases, the corresponding elongated damping passage can be substantially-entirely embedded within the clamping plate wall. In other cases, the cross-sectional profile of passage surface 426 can be open (i.e., not fully enclosed). In such cases, the corresponding elongated damping passage can be open along one or more surfaces of clamping plate 400. For example, the cross-sectional profile of passage surface 426 is shown as having an approximately U-shaped cross-sectional configuration. As such, elongated damping passage 422 is formed within clamping plate wall 402 as an open channel that is accessible from along surface 406. It will be appreciated that other configurations and/or arrangements could alternately be used.

In cases in which the cross-sectional profile of passage surface 426 is open or otherwise not fully enclosed, it may be desirable to substantially inhibit or at least reduce pressurized gas transfer between adjacent rings or other sections of elongated damping passage 422 along surface 406. It will be appreciated that inhibiting or at least reducing such undesirable pressurized gas transfer may promote pressurized gas flow along elongated damping passage 422 and, thus, provide improved gas damping performance. It will be appreciated that such undesirable pressurized gas transfer can be inhibited or otherwise reduced in any suitable manner and through the use of any suitable components, features and/or elements. As one example, one or more sealing elements could be disposed between surface 406 of clamping plate wall 402 and end wall 324 of end member shell 308 to at least partially form a substantially fluid-tight seal therebetween. As another example, a flowed material joint could be formed between the surface of the clamping plate wall and the end wall of the end member shell. Such sealing arrangements are collectively schematically represented in FIG. 12 by dashed lines 428.

Figure 12:
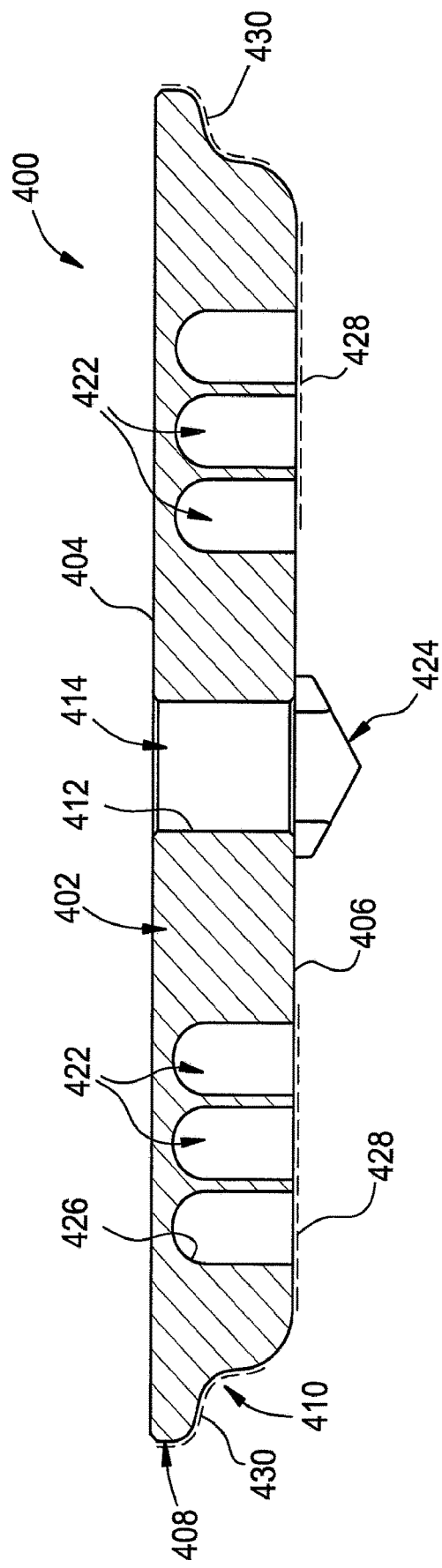
FIG. 12 is a cross-sectional side view of the exemplary clamping plate in FIGS. 7-11 taken from along line 12-12 in FIG. 9.
Figure 13:
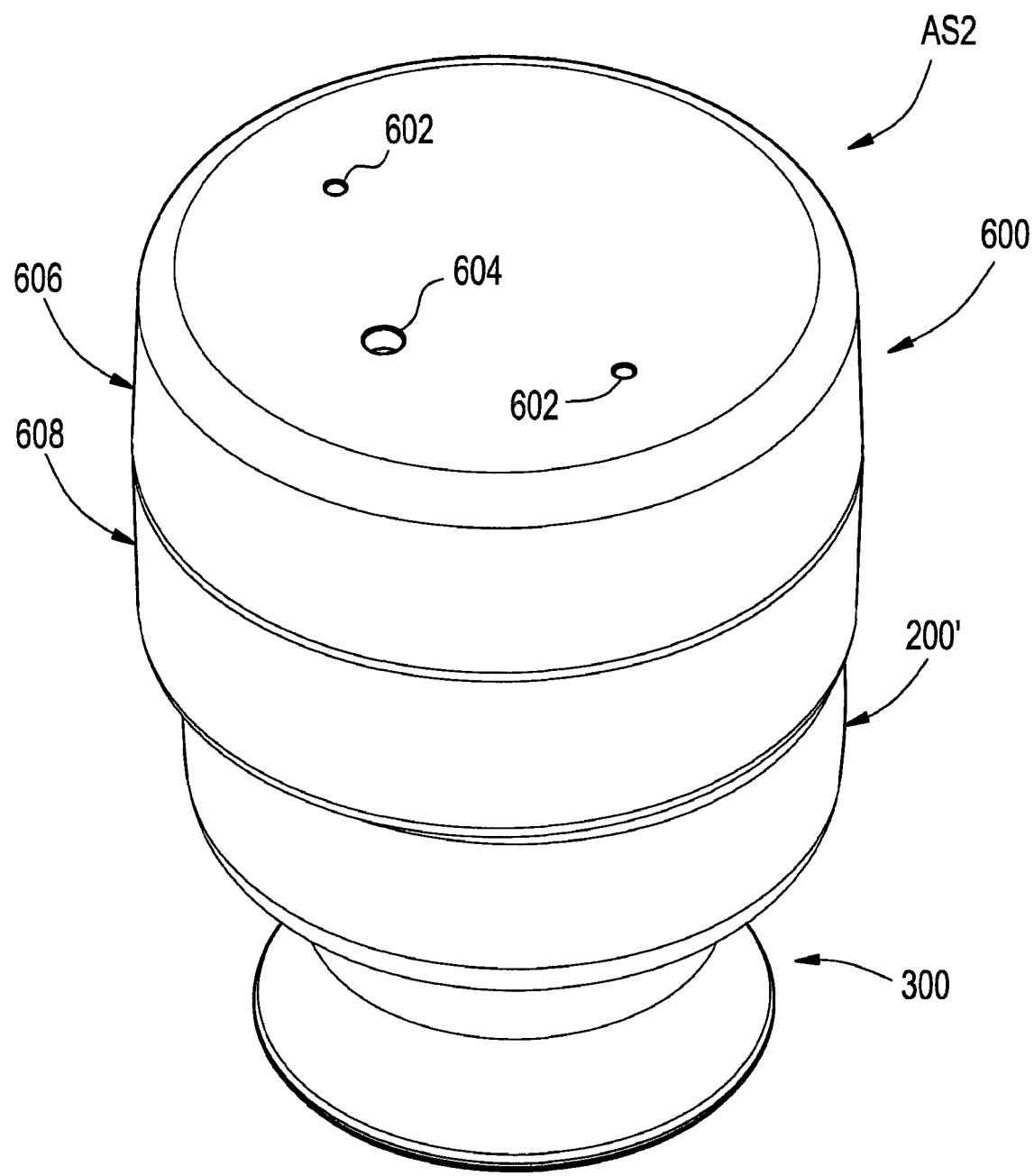
FIG. 13 is a top perspective view of another example of a gas spring assembly in accordance with the subject matter of the present disclosure.
Figure 14:
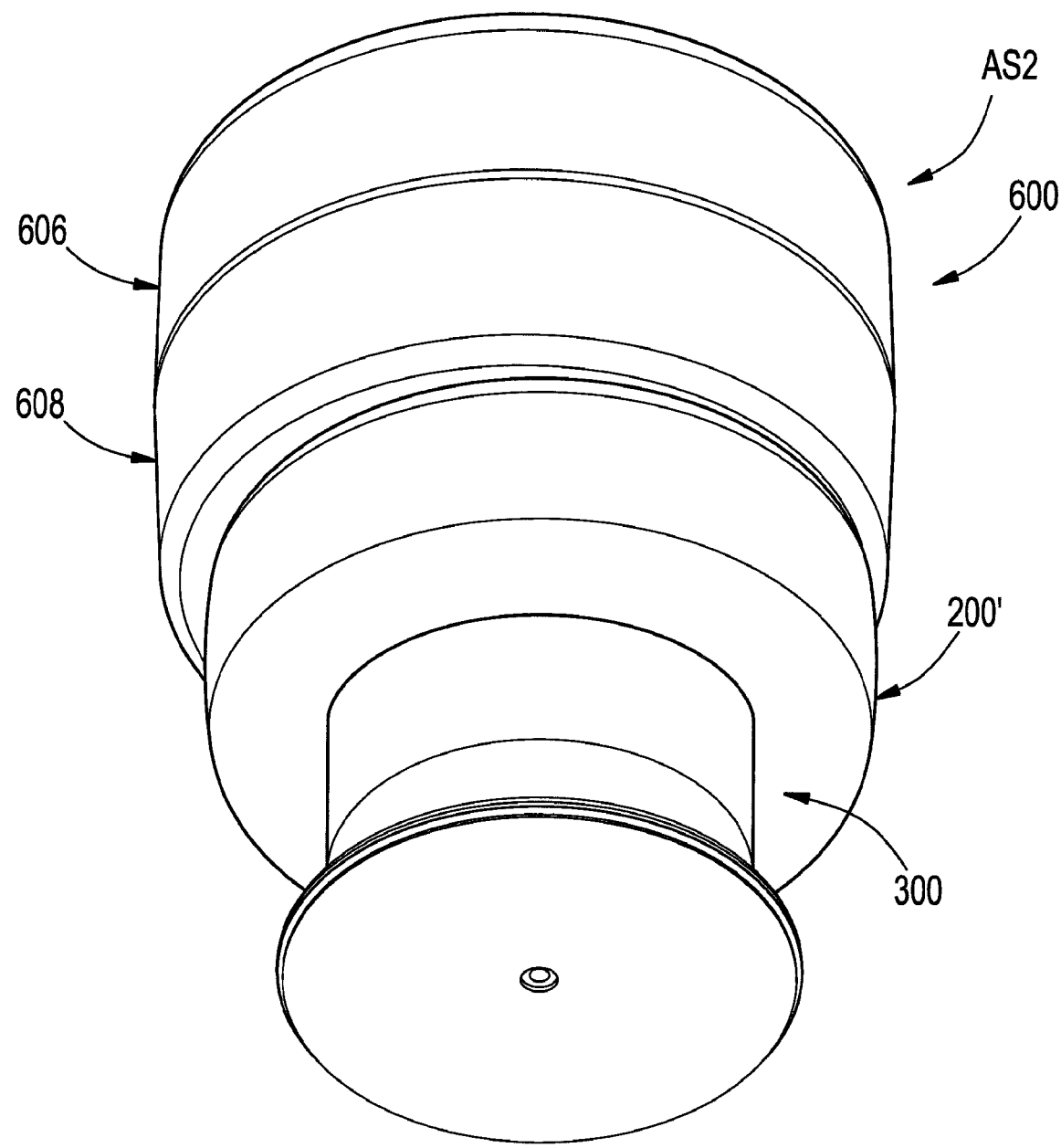
FIG. 14 is a bottom perspective view of the exemplary gas spring assembly in FIG. 13.
Figure 15:
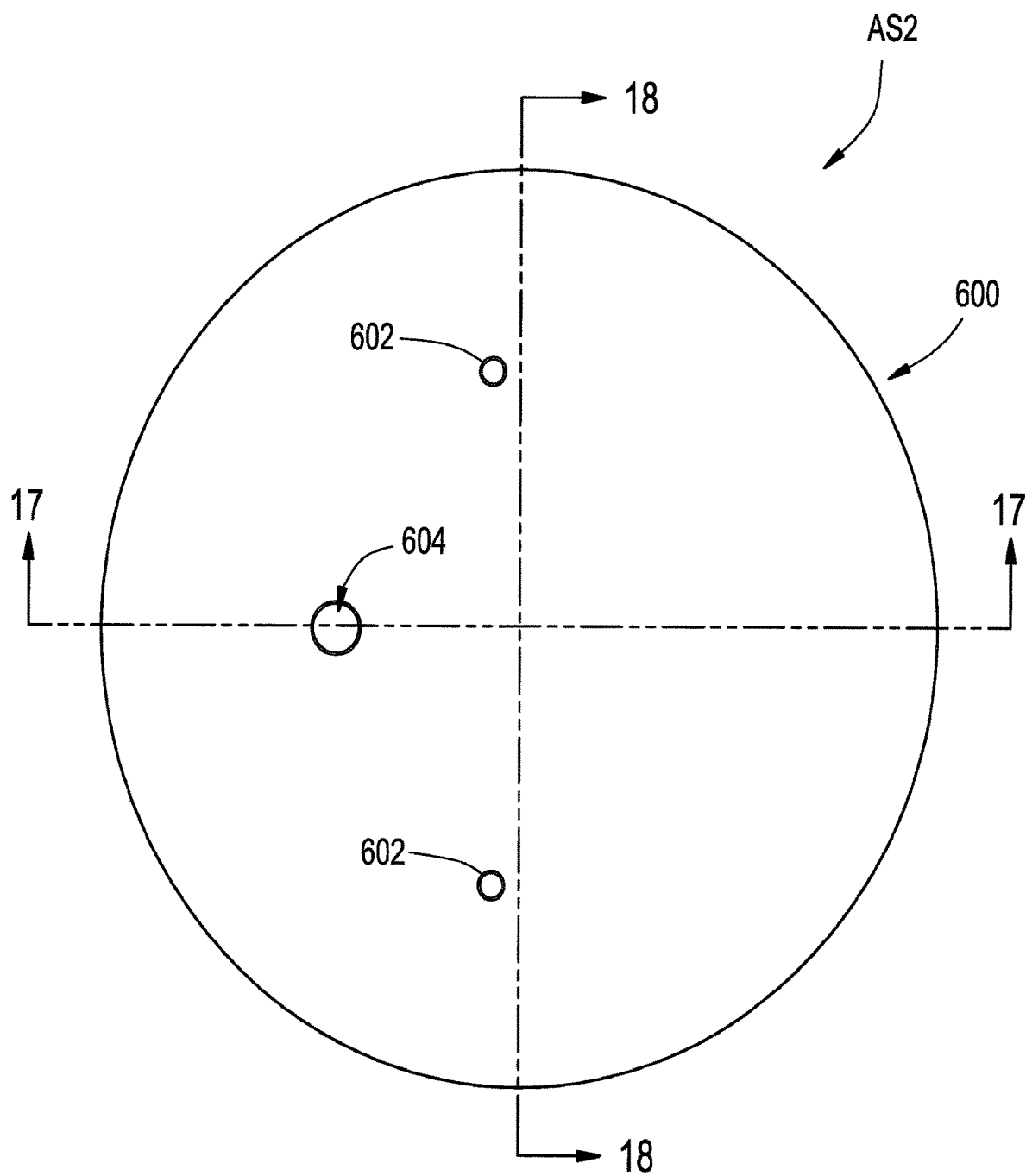
FIG. 15 is a top plan view of the exemplary gas spring assembly in FIGS. 13 and 14.
Figure 16:
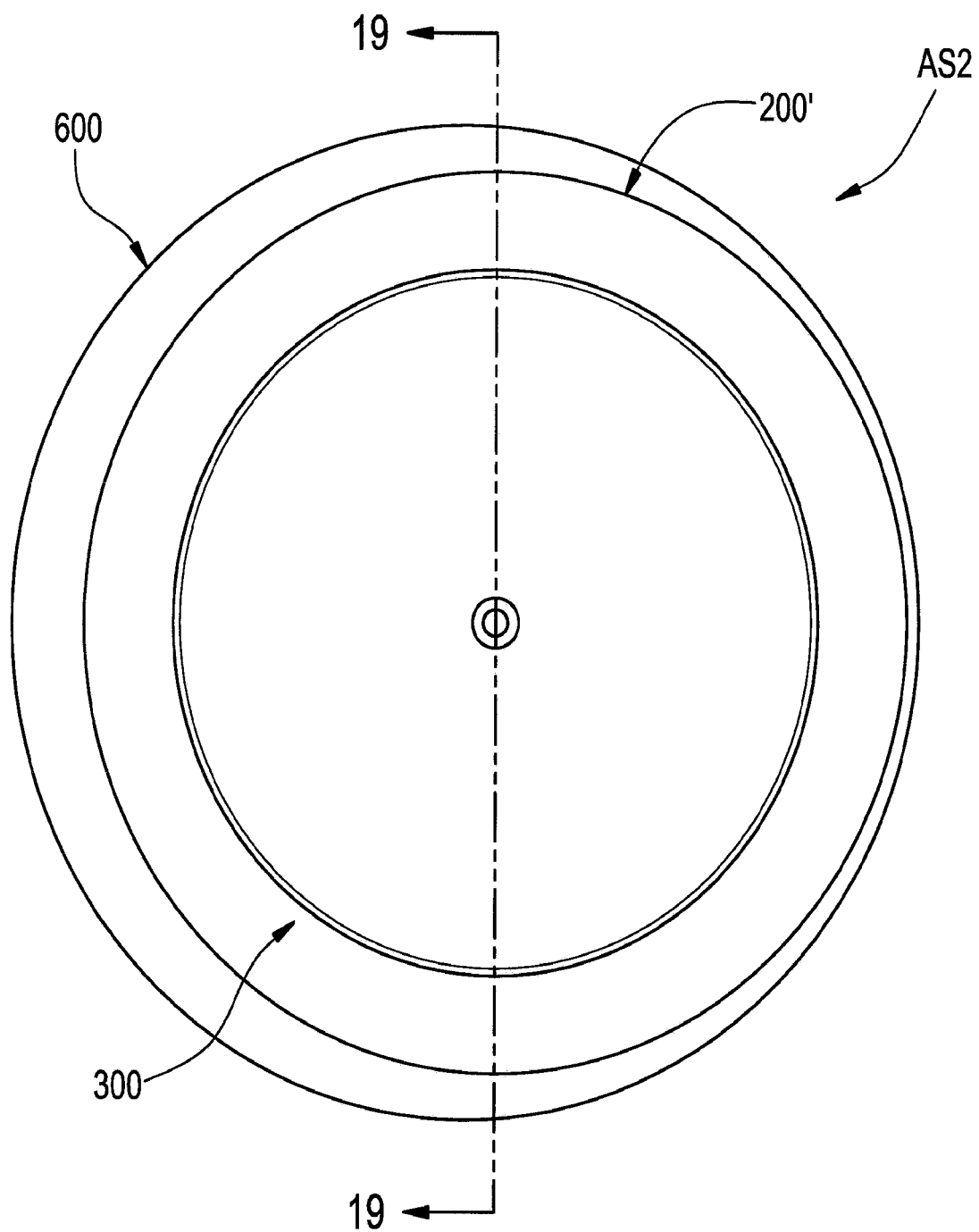
FIG. 16 is a bottom plan view of the exemplary gas spring assembly in FIGS. 13-15.
Figure 17:
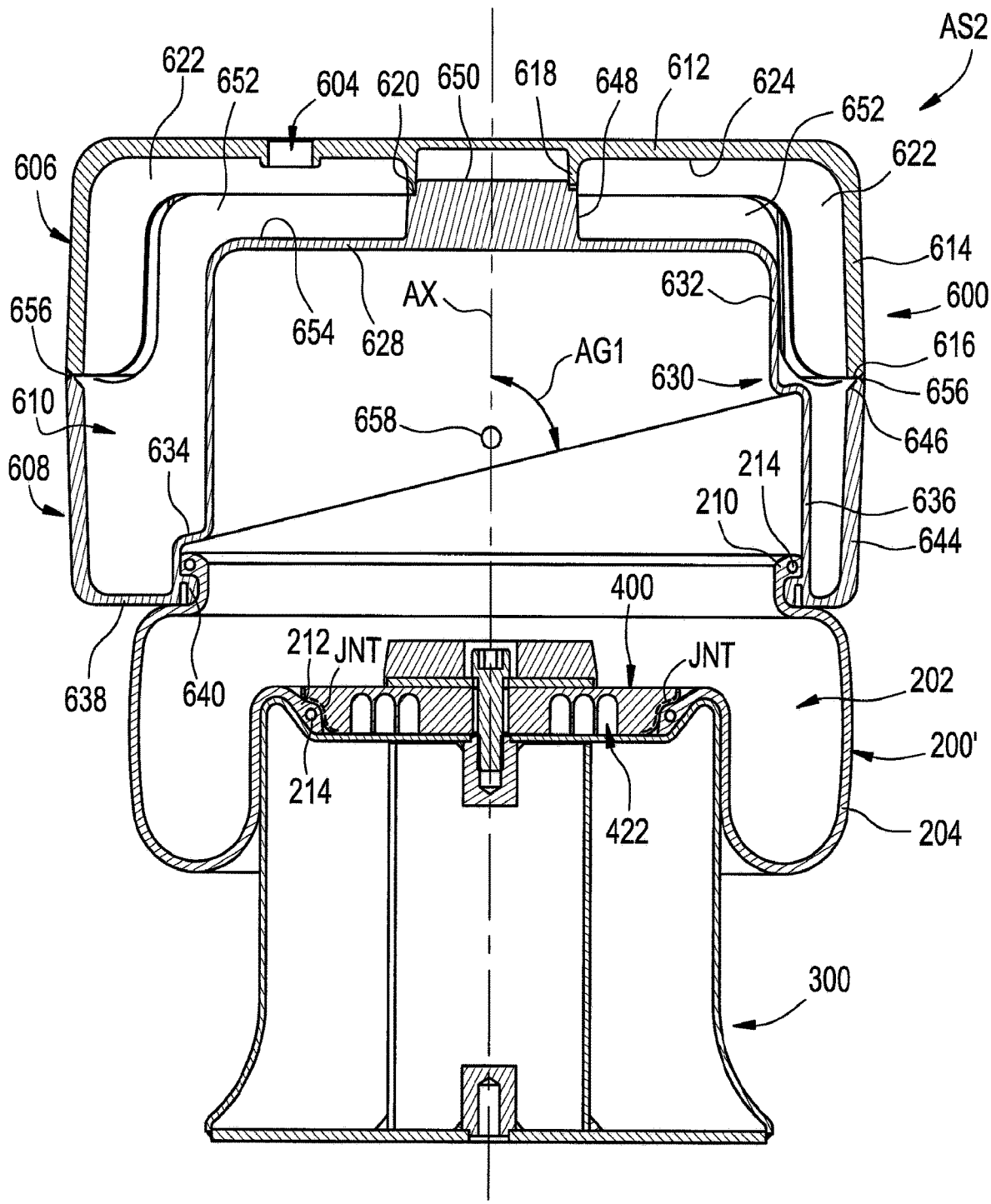
FIG. 17 is a cross-sectional side view of the exemplary gas spring assembly in FIGS. 13-16 taken from along line 17-17 in FIG. 15.

It will be appreciated that clamping plate 400 can be operatively engaged with a portion (e.g., mounting bead 212) of flexible spring member 200 in any manner suitable for urging the portion of the flexible spring member into abutting engagement with a wall or wall portion (e.g., frustoconical wall 326) of end member 300. In some cases, clamping plate 400 can be maintained as an individual component of the gas spring assembly that is separable from or otherwise removably secured to flexible spring member 200 and end member 300. In some such constructions, a substantially fluid-tight joint can be formed between the flexible spring member and the clamping plate, such as either through abuttingly engaging surfaces (or surface portions) or through the use of an adhesive and/or sealing material, which are schematically represented in FIG. 12 by dashed lines 430 disposed along outer peripheral surface 408 and/or annular recess 410, for example. In other cases, the clamping plate can be permanently secured or otherwise attached to one or more components of the gas spring assembly. For example, a portion (e.g., mounting bead 212) of flexible spring member 200 can be adhered, vulcanized, cured or otherwise permanently attached (i.e., inseparable without damage, destruction or material alteration of at least one of the component parts) to clamping plate 400 or a surface portion thereof (e.g., outer peripheral surface 408 and/or annular recess 410), such as are represented in FIGS. 5, 6 and 17 by dashed lines JNT, for example.

End member (or end member assembly) 500 can be operatively secured along or across end 206 of flexible spring member 200 such that a substantially fluid-tight seal is formed therebetween. It will be appreciated that end member 500 can be of any suitable type, kind and/or configuration. As one example, the end member could take the form of a conventional bead plate or top cap. As another example, end member 500 is shown as taking the form of a reservoir end member that includes at least one end member wall that defines an end member chamber. In the arrangement shown in FIGS. 2-7, end member 500 includes an end member wall 508 that forms an outer shell of end member 500 and an end member wall 510 that forms an inner shell of the end member. In an assembled condition, end member walls 508 and 510 at least partially define an end member chamber 512 within end member 500.

It will be appreciated that end member walls 508 and 510 can include any suitable number of one or more wall portions. For example, end member wall 508 can include an end wall portion 514 along which mounting studs 502 are operatively connected. An outer side wall portion 516 extends axially from along end wall portion 514 toward a distal side wall portion 518. End member wall 510 can include an inner side wall portion 520 that extends axially toward a mounting wall portion 522 that includes a mounting edge 524. End member wall 510 can be secured on or along end member wall 508 in any suitable manner. As one example, a flowed-material joint 526 can be formed between end wall portion 514 and mounting wall portion 522 along mounting edge 524 thereof. It will be appreciated, however, that other configurations and/or arrangements could alternately be used.

End member wall 510 can also include a distal side wall portion 528 that is operatively connected to inner side wall portion 520 by a connector wall portion 530. Distal side wall portion 518 is shown as being disposed radially outward of end 206 and mounting bead 210 of flexible spring member 200. Distal side wall portion 528 is shown as being disposed radially inward of end 206 and mounting bead 210. In a preferred arrangement, end 206 and/or mounting bead 210 are captured or otherwise retained between distal side wall portions 518 and 528 such that a substantially fluid-tight connection is formed therebetween. It will be appreciated that such a substantially fluid-tight connection can be formed in any suitable manner, such as, for example, by crimping or otherwise radially deforming one or more of distal side wall portions 518 and/or 528 toward and into engagement with end 206 of flexible spring member 200. One or more holes or openings can extend through end member wall 510 such that end member chamber 512 and spring chamber 202 are disposed in fluid communication with one another. In the arrangement shown in FIGS. 5 and 6, for example, one or more holes or openings 532 extend through inner side wall portion 520. It will be appreciated, however, that other configurations and/or arrangements could alternately be used.

Another example of a gas spring assembly AS2, such as may be suitable for use as one or more of gas spring assemblies 102 in FIG. 1, for example, is shown in FIGS. 13-19 as having a longitudinal axis AX (FIG. 17) and including a flexible spring member 200' that is substantially similar to flexible spring member 200 shown and described above in connection with FIGS. 2-6. Gas spring assembly also includes an end member (or end member assembly) 300 that is secured to the flexible spring member by way of a clamping plate 400. Gas spring assembly AS2 further includes an end member (or end member assembly) 600 that is secured to the flexible spring member in a suitable manner in spaced relation to end member 300. Flexible spring member 200' can be secured one or along end members in a substantially fluid-tight manner such that a spring chamber 202 (FIGS. 17-19) is at least partially defined by the flexible spring member between the end members.

Figure 18:
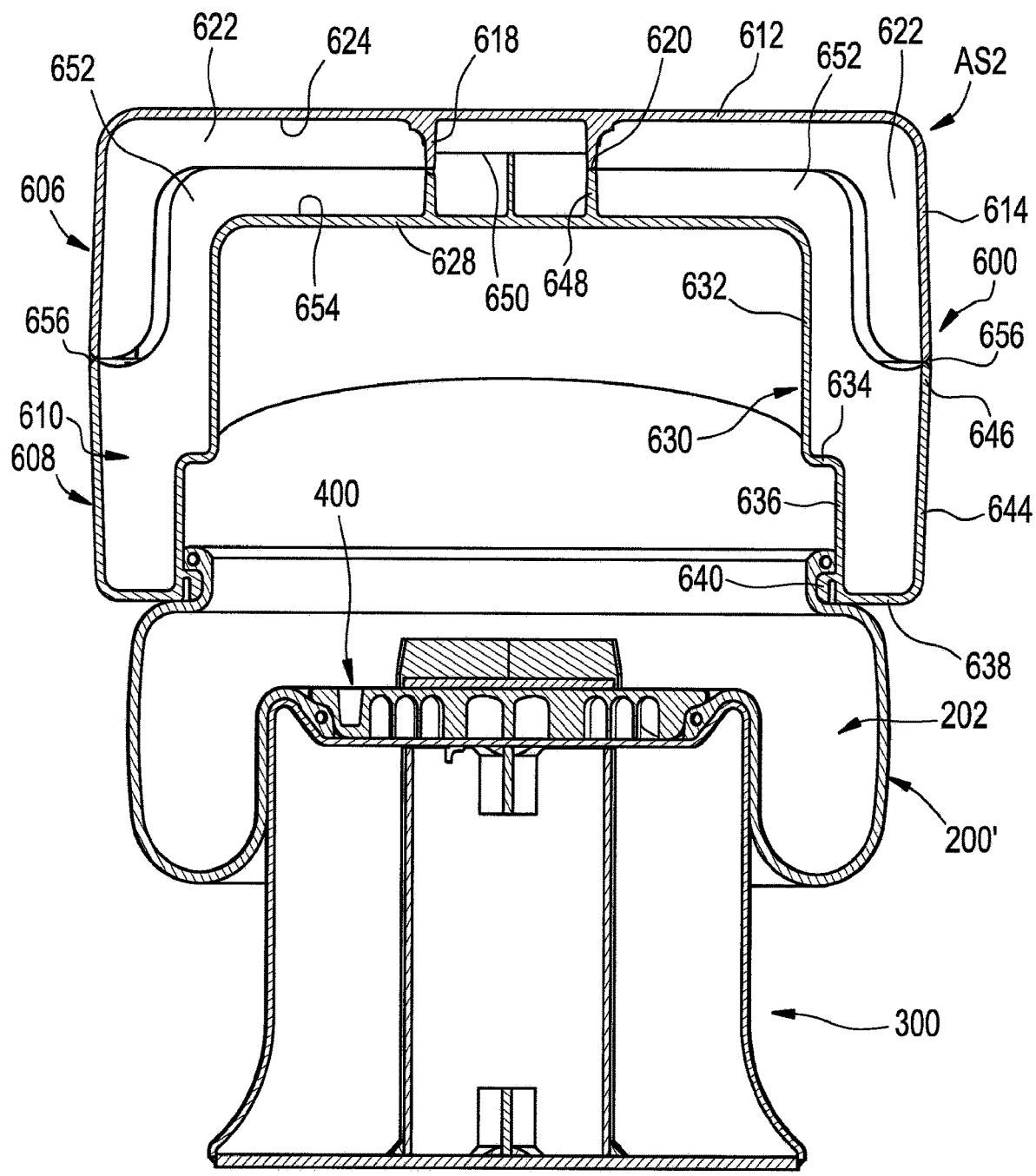
FIG. 18 is a cross-sectional side view of the exemplary gas spring assembly in FIGS. 13-17 taken from along line 18-18 in FIG. 15.
Figure 19:
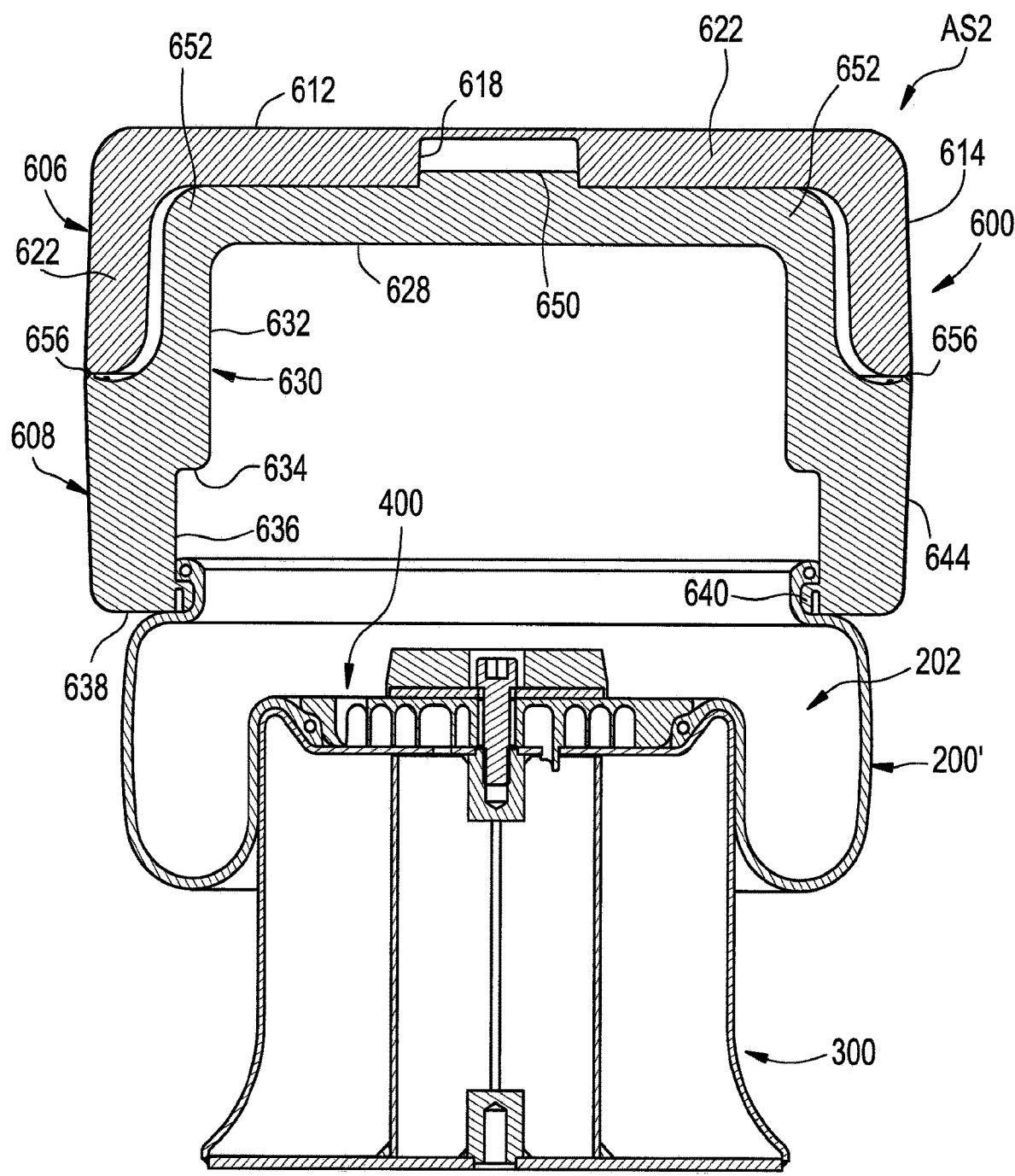
FIG. 19 is a cross-sectional side view of the exemplary gas spring assembly in FIGS. 13-18 taken from along line 19-19 in FIG. 16.
Figure 20:
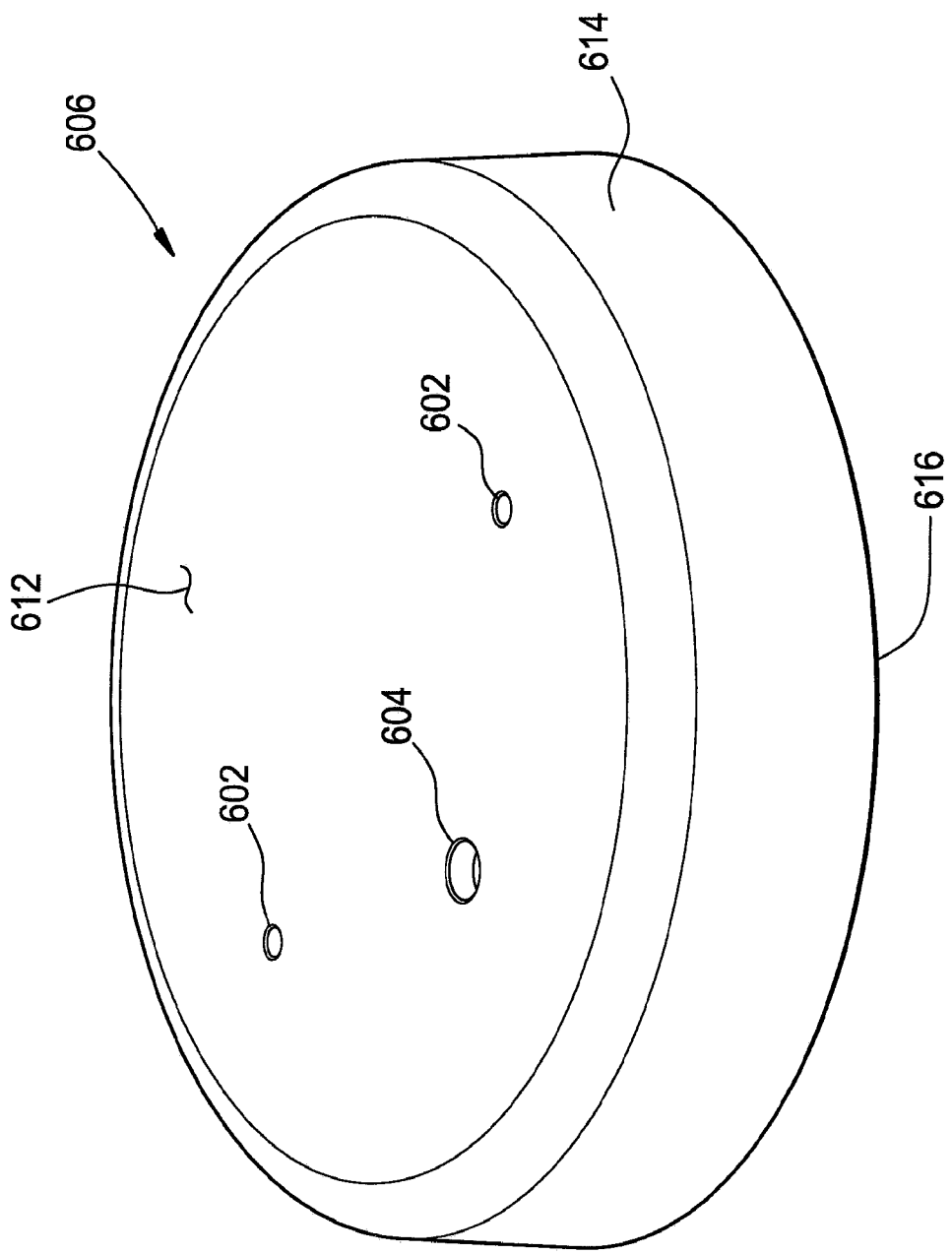
FIG. 20 is a top perspective view of one example of an end member component in accordance with the subject matter of the present disclosure, such as may be suitable for use in connection with the gas spring assembly in FIGS. 13-19.

Flexible spring member 200' differs slightly from flexible spring member 200, which has been described above in detail in connection with FIGS. 2-6. In particular, end 206' of flexible spring member 200' extends radially outward to engage corresponding features of end member 600, as shown in FIGS. 17-19. Whereas, end 206 of flexible spring member 200 extends in an approximately axial direction and is captured between adjacent wall portions of end member 500. Otherwise, it is to be recognized and understood that the foregoing description of flexible spring member 200, end member 300 and clamping plate 400, including all of the features and functions thereof as well as any components that associated therewith, is equally applicable to gas spring assembly AS2 as if repeated in full detail here.

As described above in connection with gas spring assembly AS1, gas spring assembly AS2 can be disposed between associated sprung and unsprung masses of an associated vehicle in any suitable manner. For example, one end member can be operatively connected to the associated sprung mass with the other end member disposed toward and operatively connected to the associated unsprung mass. Similar to the arrangement shown in FIG. 6, for example, end member 600 can be secured on or along a first or upper structural component USC (FIG. 6) such as associated vehicle body BDY in FIG. 1, for example, and can be secured thereon in any suitable manner, such as has been previously described. For example, one or more threaded passages 602 can be included along end member 600 that are dimensioned to receive corresponding securement devices, such as threaded fasteners, for example. Additionally, one or more fluid communication ports, such as transfer passages 604, for example, can, optionally, be provided to permit fluid communication with spring chamber 202, such as may be used for transferring pressurized gas into and/or out of the spring chamber, for example. In the exemplary embodiment shown, transfer passages 604 extend through one or more walls and/or wall portions of end member 600 and are in fluid communication with spring chamber 202. It will be appreciated, however, that any other suitable fluid communication arrangement could alternately be used.

Additionally, end member assembly 300 can be secured on or along a second or lower structural component LSC (FIG. 6), such as an axle AXL in FIG. 1, for example, in any suitable manner, such as has been described above in detail. As one example, lower structural component LSC could include one or more mounting holes HLS (FIG. 6) extending therethrough. In such case, a threaded fastener 302 (FIG. 6) could extend through one of mounting holes HLS and threadably engage end member 300 or another component of the assembly to secure the end member on or along the lower structural component.

Turning, now, to FIGS. 13-19 as well as FIGS. 20-25 and FIGS. 26-32, end member 600 can take the form of a reservoir end member that includes at least one end member wall that defines an end member chamber. In the arrangement shown, end member 600 includes an end member wall 606 that at least partially forms a first or upper shell of end member 600 and an end member wall 608 that at least partially forms a second or lower shell of the end member. In an assembled condition end member walls 606 and 608 at least partially define an end member chamber 610 within end member 600.

Figure 21:
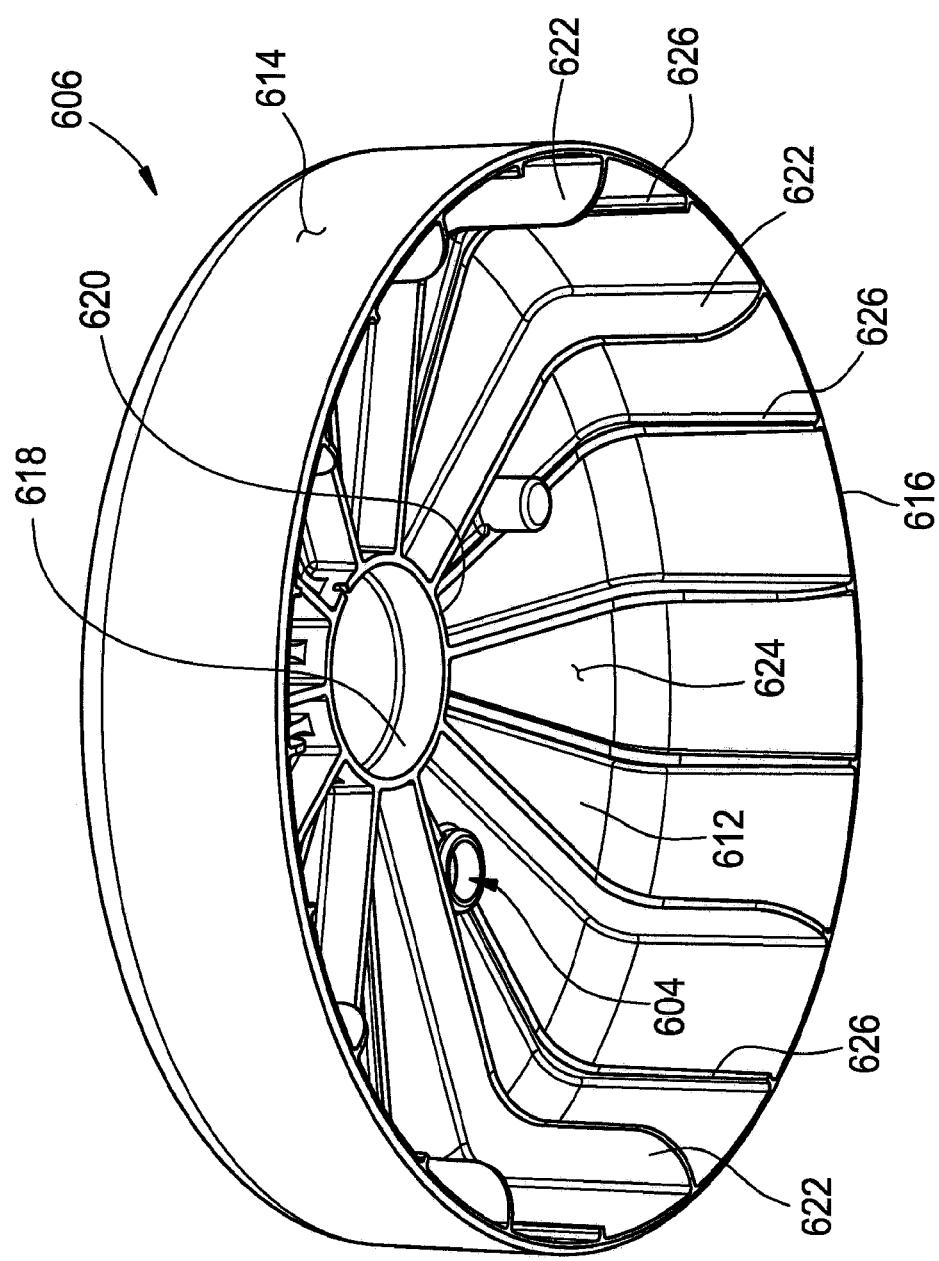
FIG. 21 is a bottom perspective view of the exemplary end member component in FIG. 20.
Figure 22:
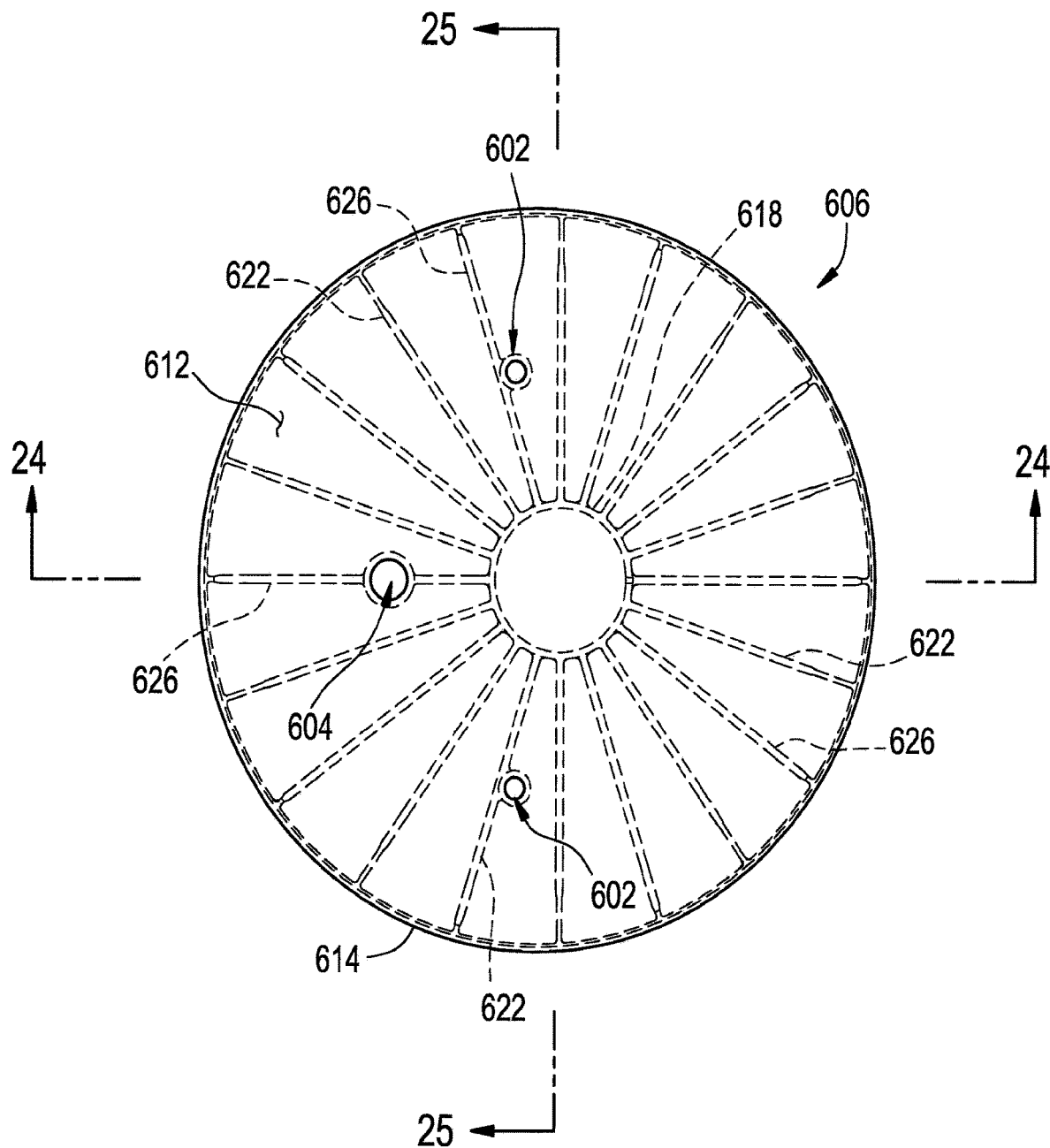
FIG. 22 is a top plan view of the exemplary end member component in FIGS. 20 and 21.
Figure 23:
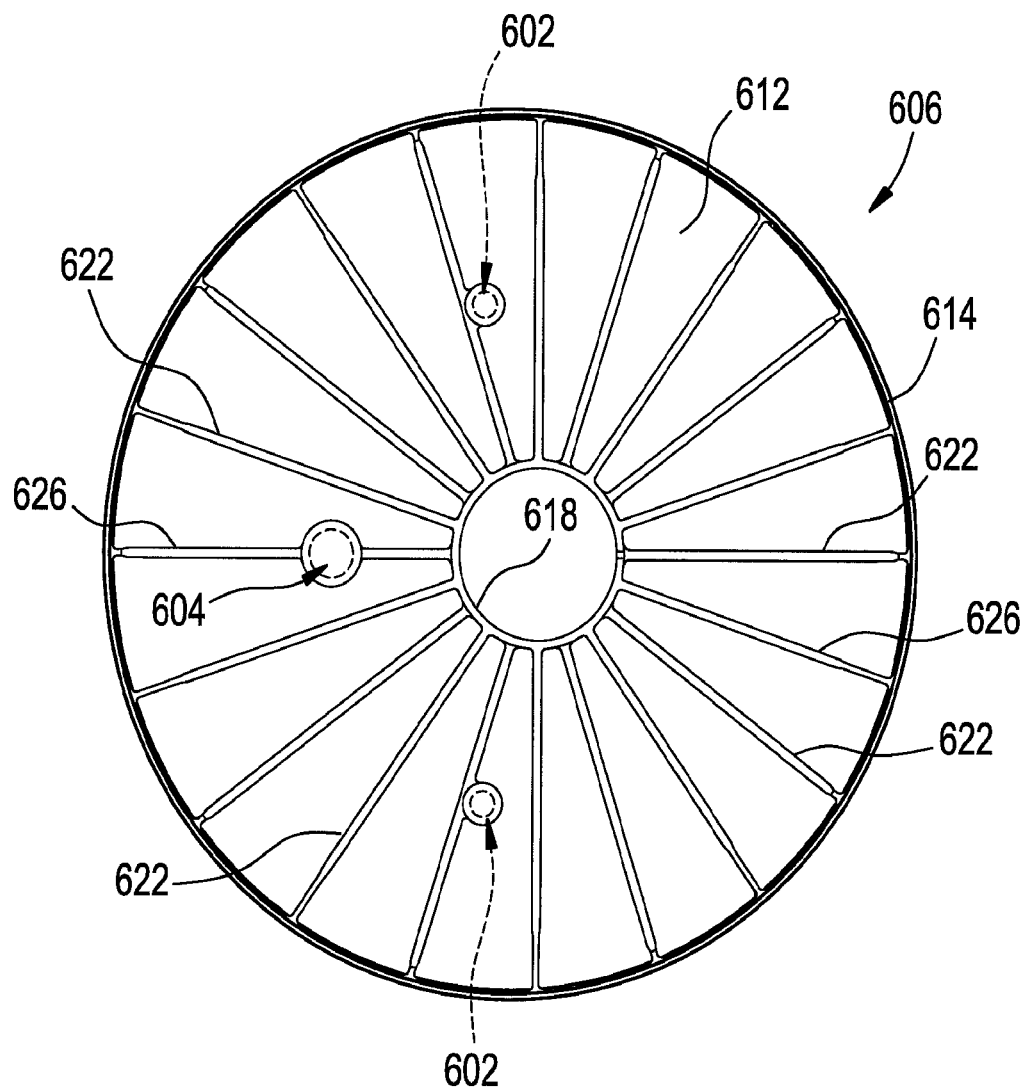
FIG. 23 is a bottom plan view of the exemplary end member component in FIGS. 20-22.
Figure 24:
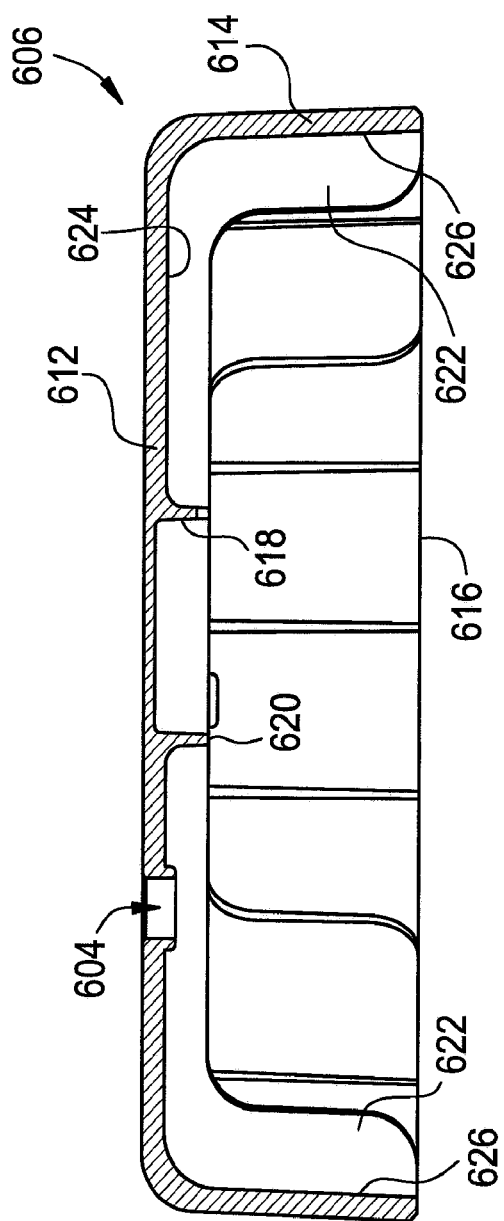
FIG. 24 is a cross-sectional side view of the exemplary end member component in FIGS. 20-23 taken from along line 24-24 in FIG. 22.
Figure 25:
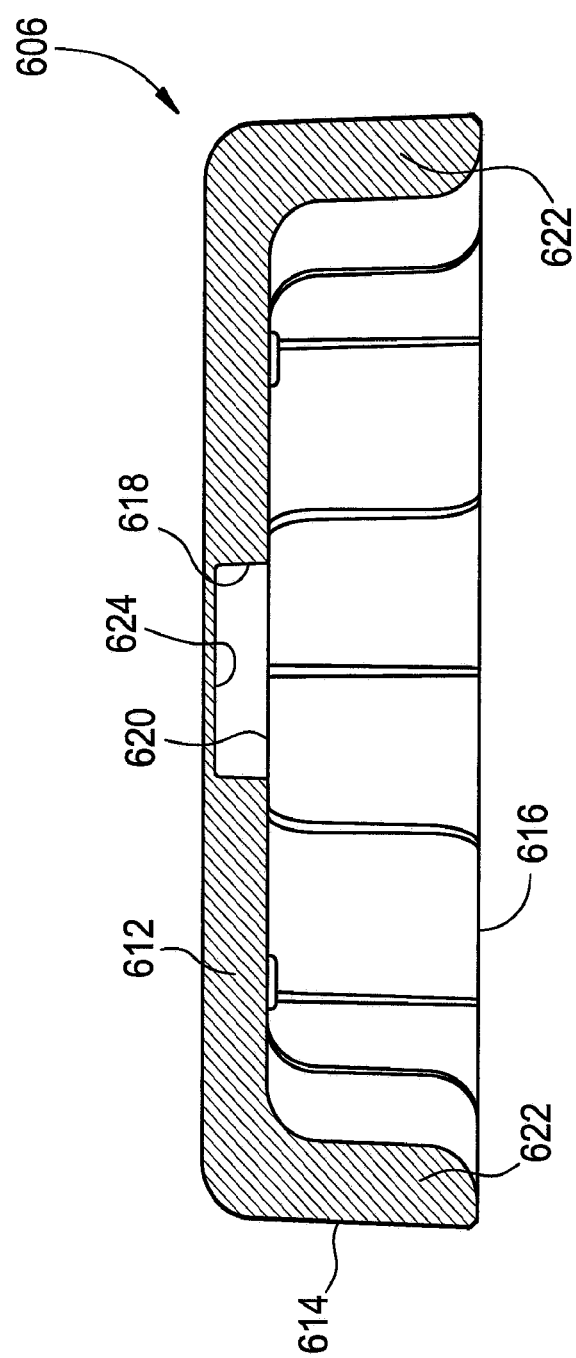
FIG. 25 is a cross-sectional side view of the exemplary end member component in FIGS. 20-24 taken from along line 25-25 in FIG. 22.
Figure 26:
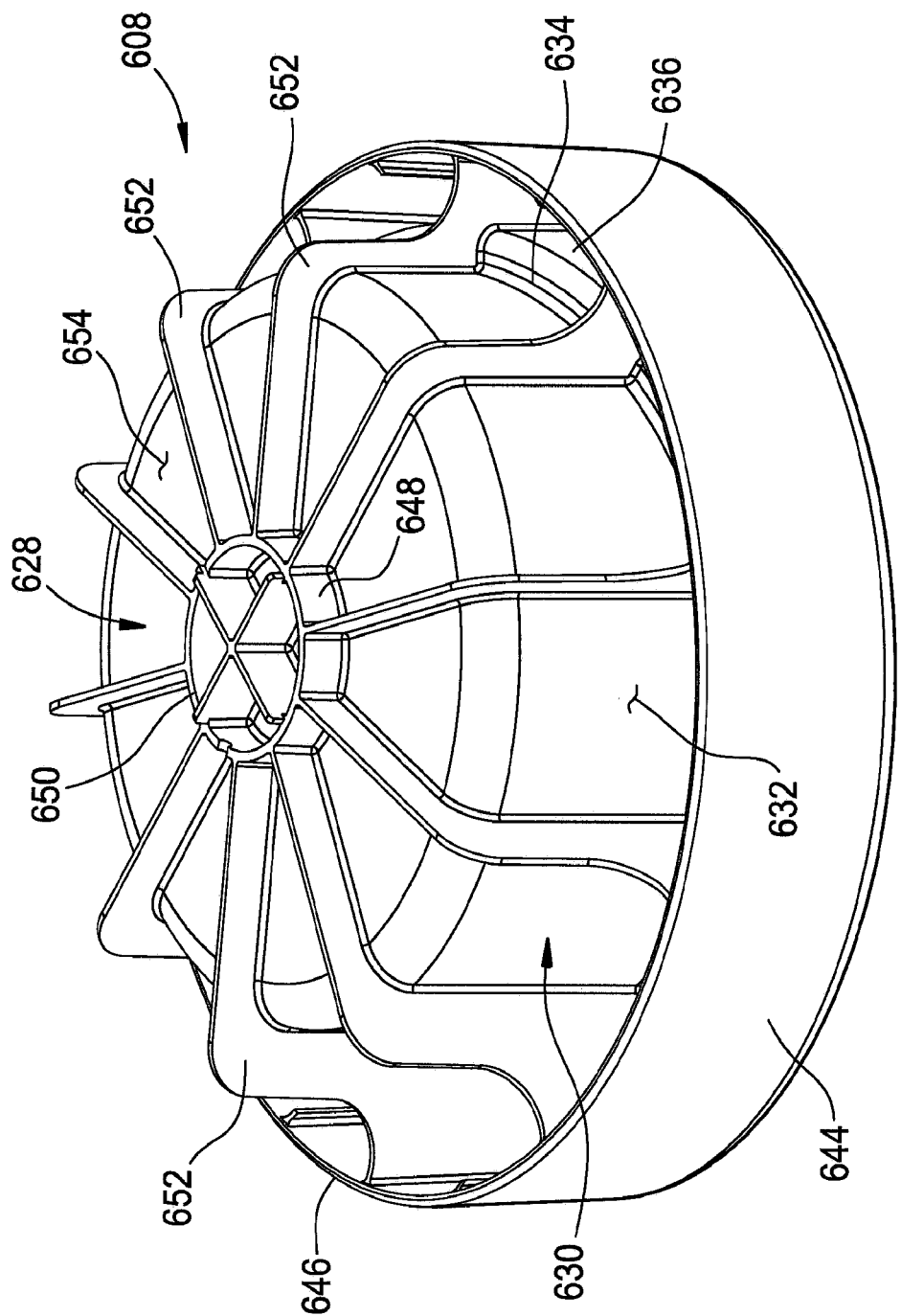
FIG. 26 is a top perspective view of another example of an end member component in accordance with the subject matter of the present disclosure, such as may be cooperative with the end member component in FIGS. 20-25 and suitable for use in connection with the gas spring assembly in FIGS. 13-19.
Figure 27:
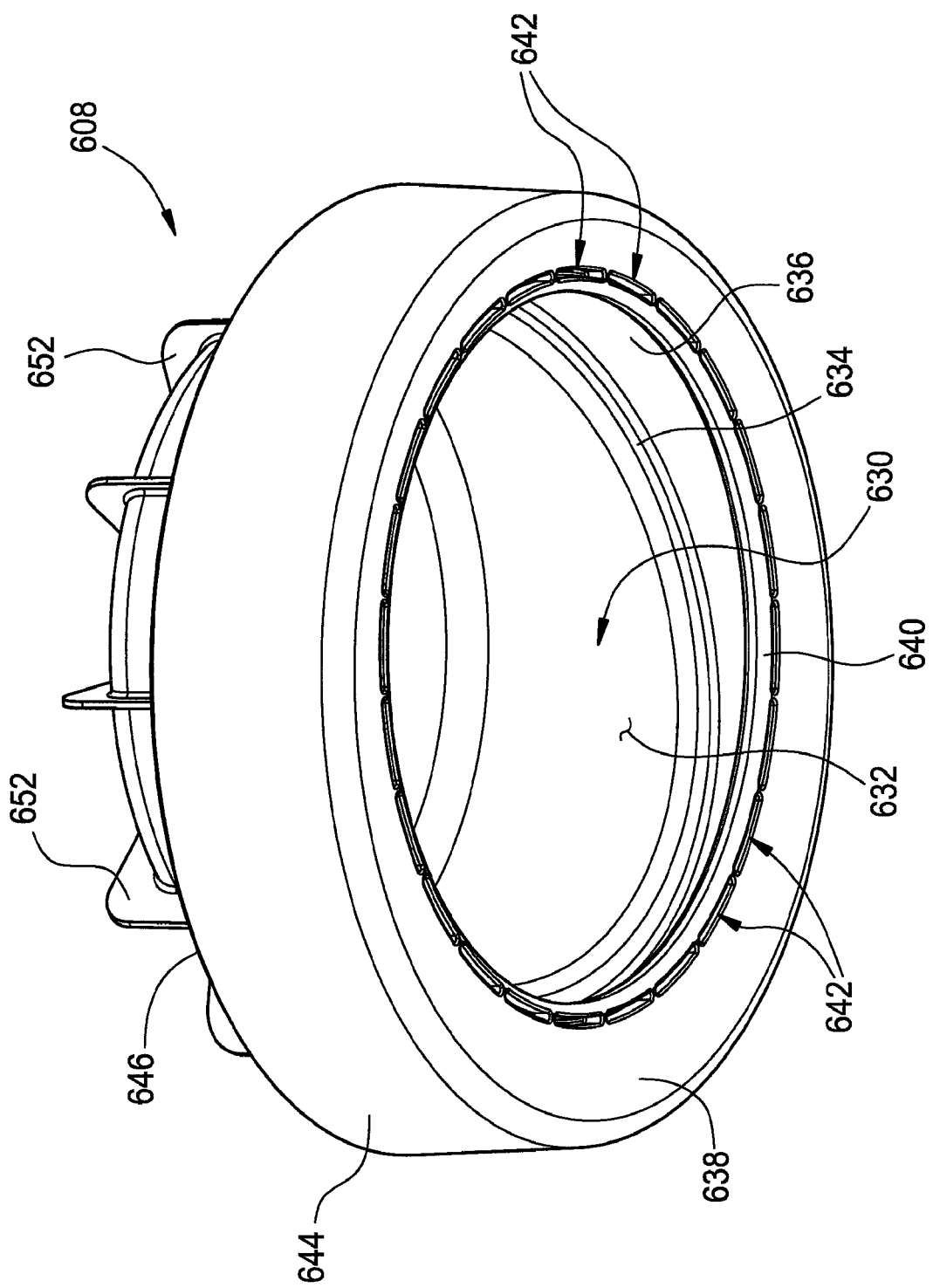
FIG. 27 is a bottom perspective view of the exemplary end member component in FIG. 26.
Figure 28:
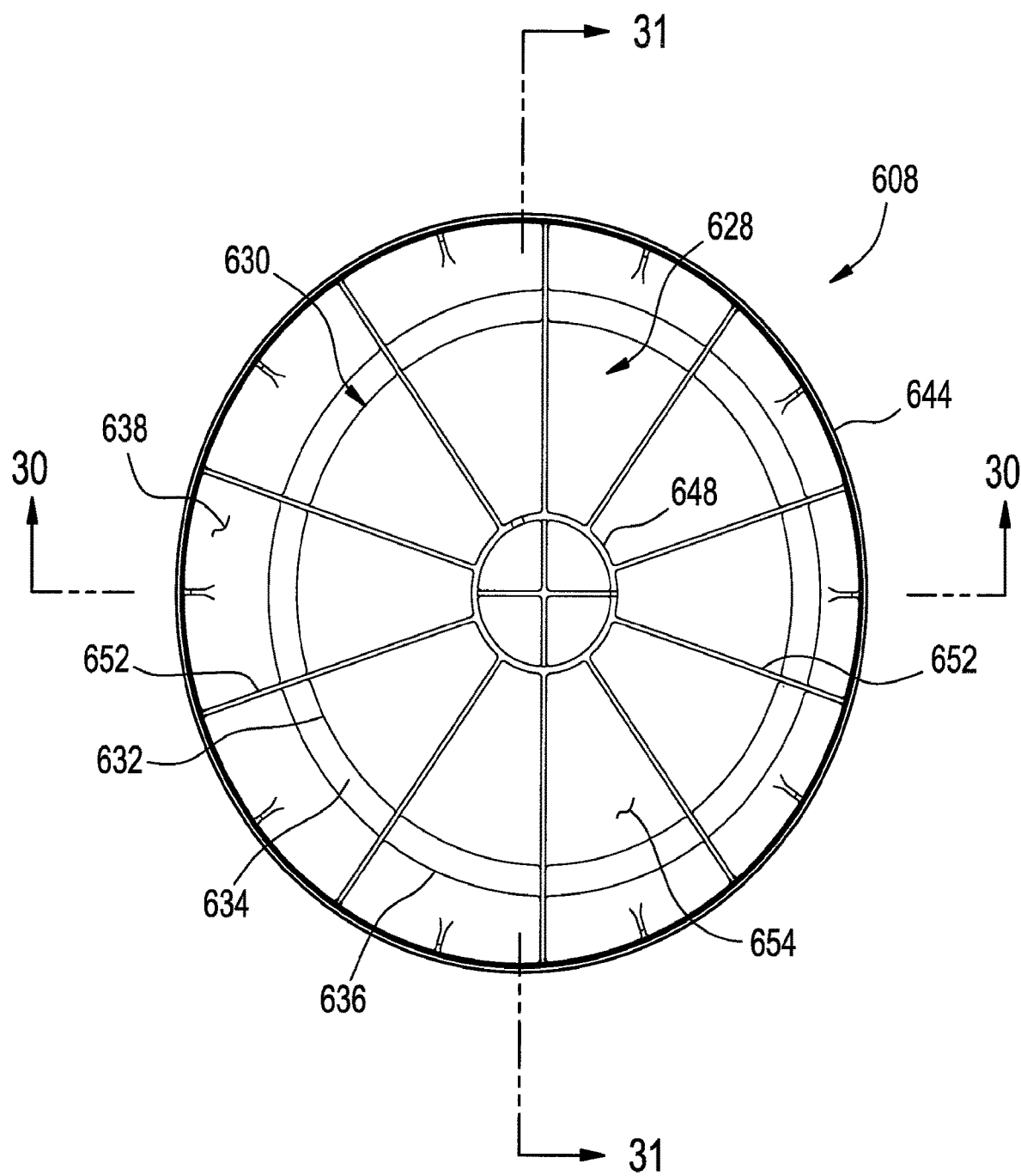
FIG. 28 is a top plan view of the exemplary end member component in FIGS. 26 and 27.
Figure 29:
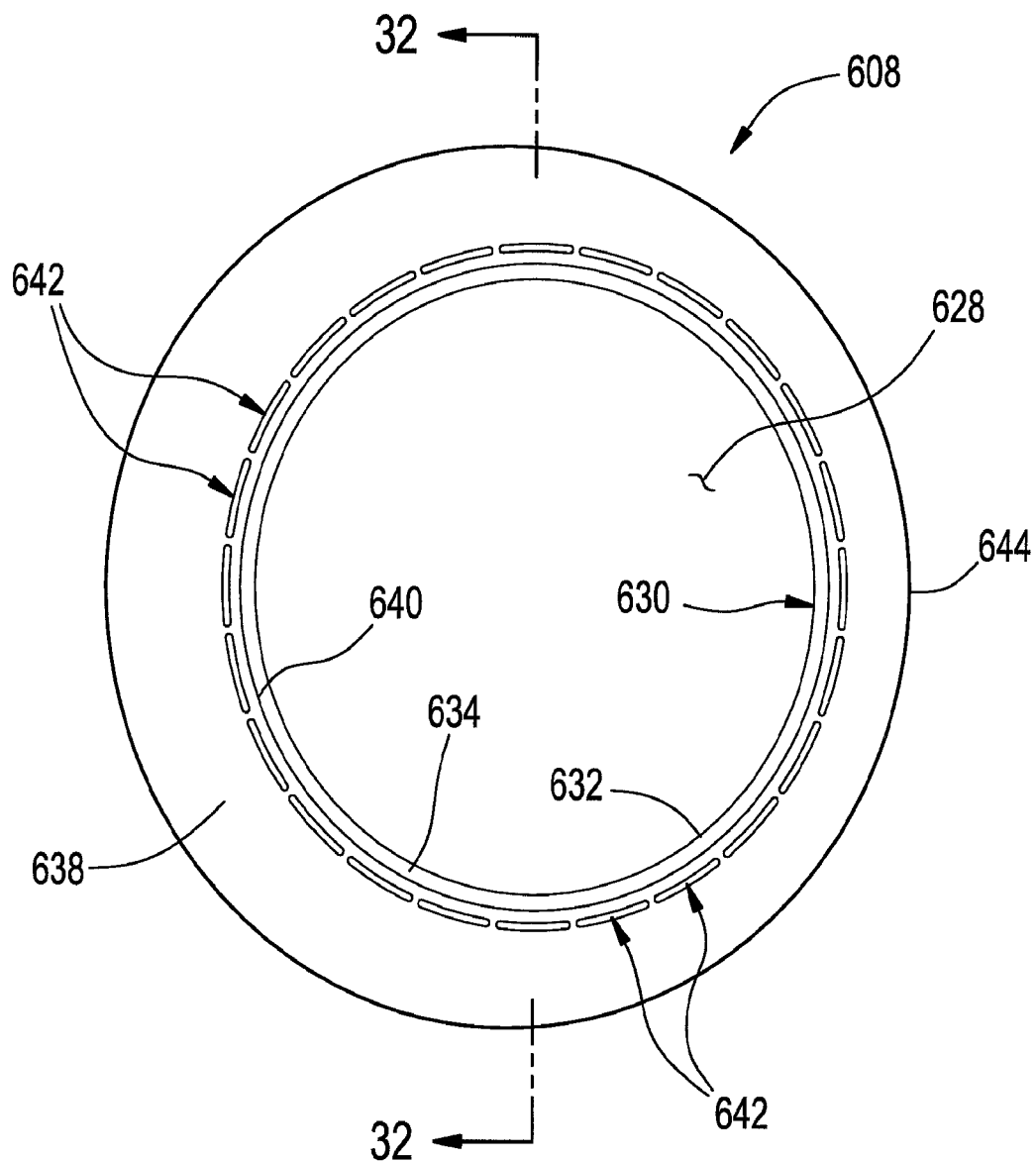
FIG. 29 is a bottom plan view of the exemplary end member component in FIGS. 26-28.
Figure 30:
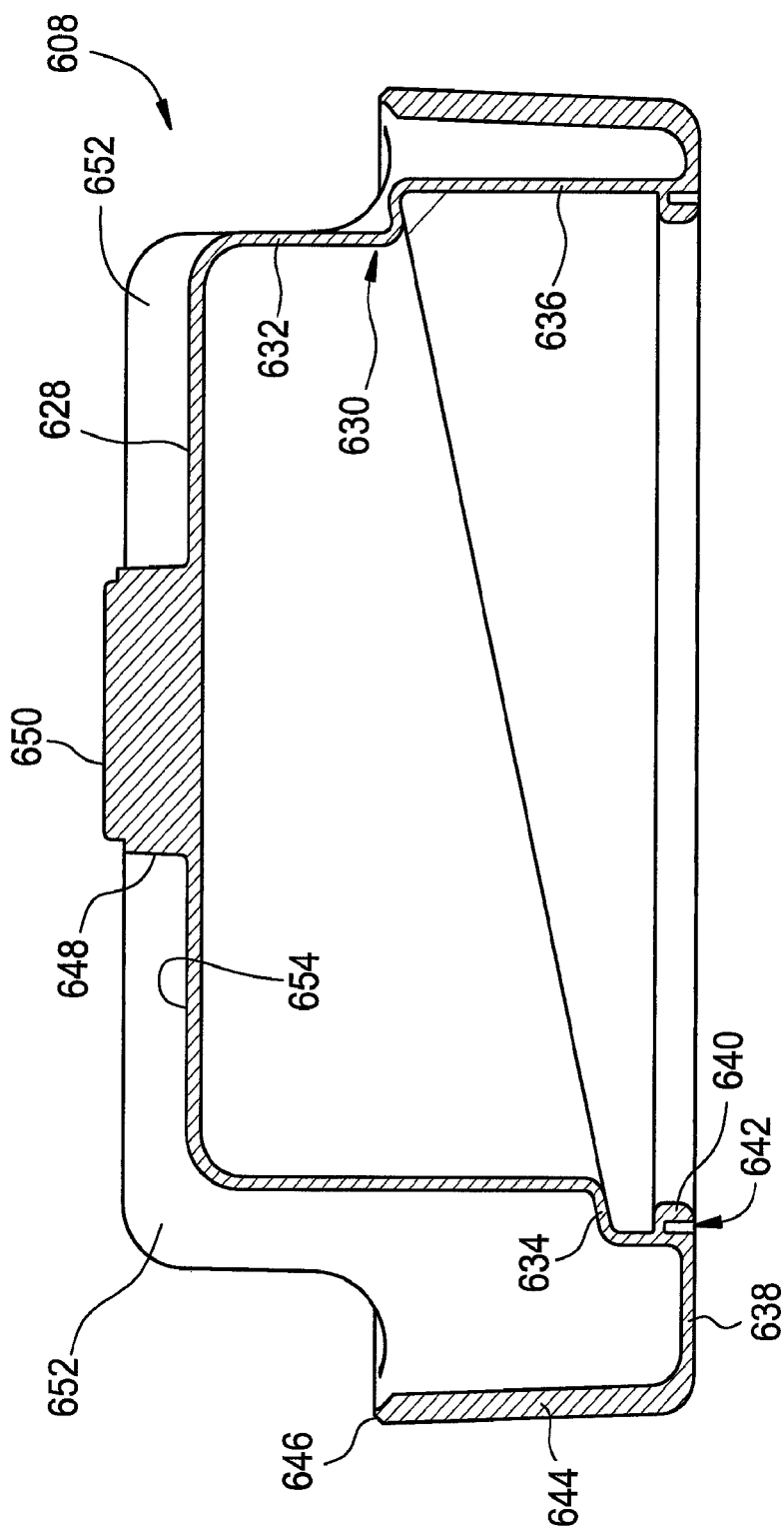
FIG. 30 is a cross-sectional side view of the exemplary end member component in FIGS. 26-29 taken from along line 30-30 in FIG. 28.
Figure 31:
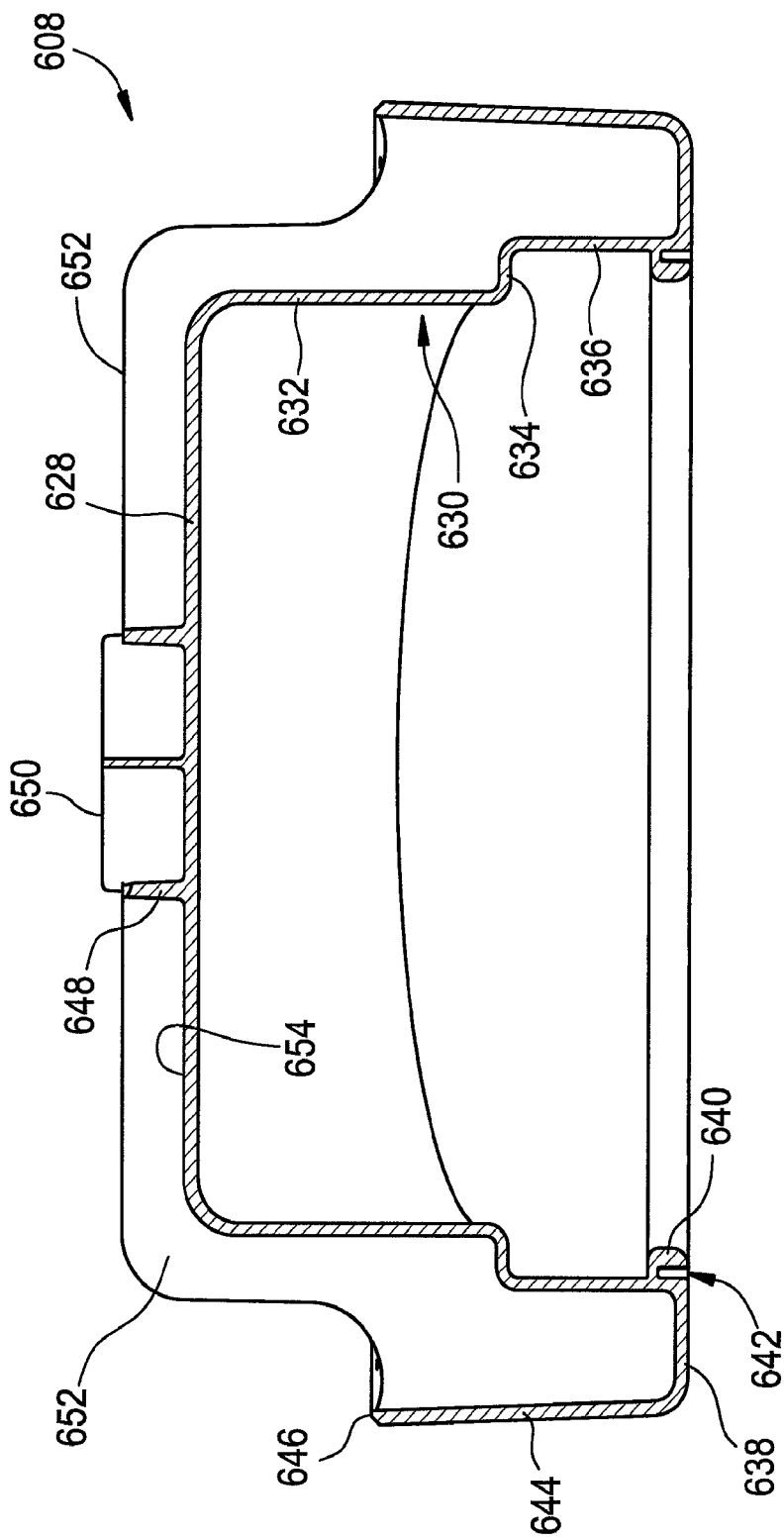
FIG. 31 is a cross-sectional side view of the exemplary end member component in FIGS. 26-30 taken from along line 31-31 in FIG. 28.
Figure 32:
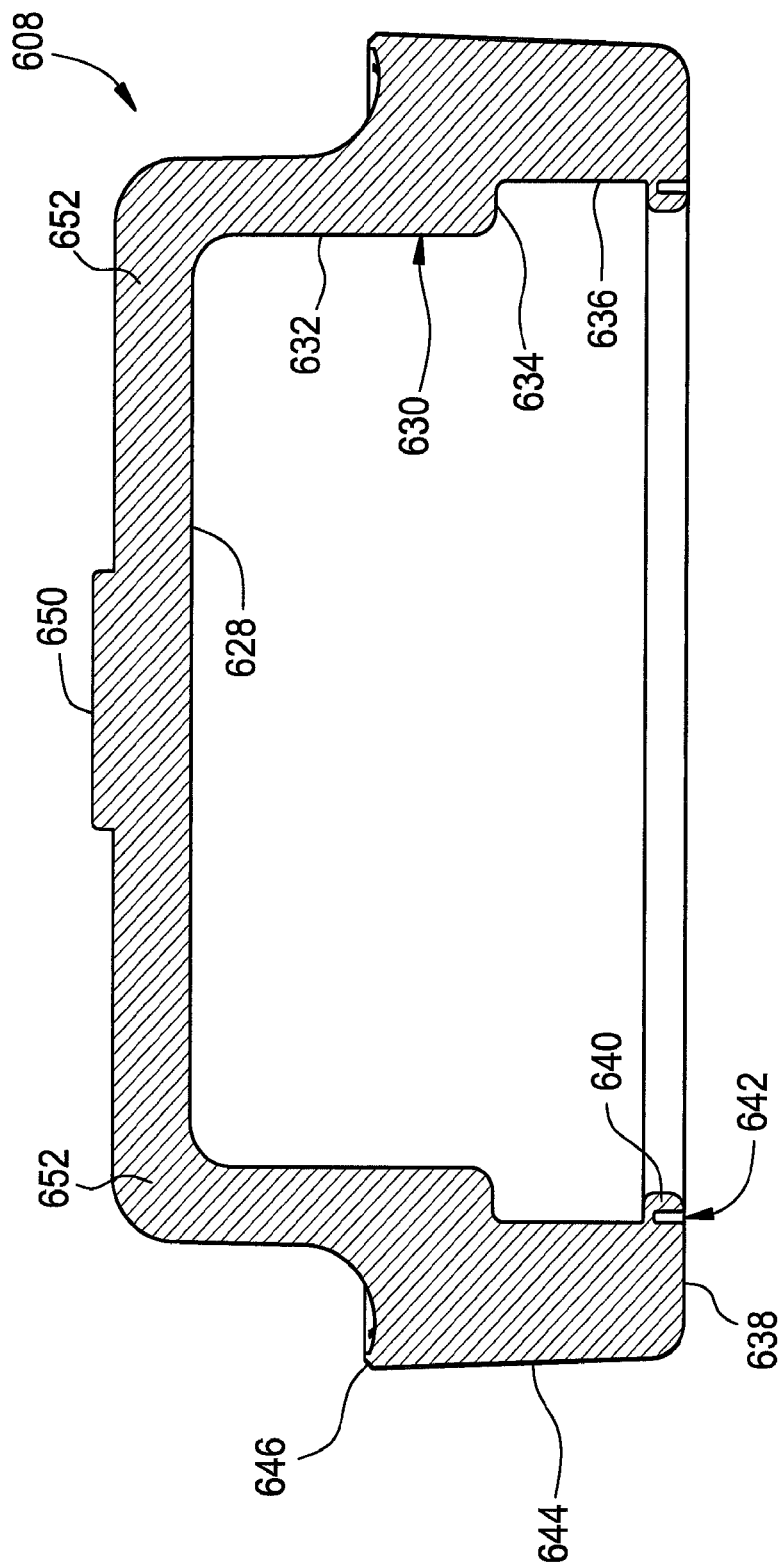
FIG. 32 is a cross-sectional side view of the exemplary end member component in FIG. 26-31 taken from along line 32-32 in FIG. 29.

It will be appreciated that end member walls 606 and 608 can include any suitable number of one or more wall portions. For example, end member wall 606 can include an end wall portion 612 along which threaded passages 602 and transfer passages 604 are operatively disposed. An outer side wall portion 614 extends axially from along end wall portion 612 toward a distal edge 616. An inner side wall portion 618 is disposed radially inward of outer side wall portion 614 and extends axially from along end wall portion 612 toward a distal edge 620. In some cases, inner side wall portion 618 can be laterally offset or otherwise eccentrically positioned relative to outer side wall portion 614. Additionally, end member wall 606 is shown as including a plurality of connecting walls 622 that extend along an inner surface 624 of end wall portion 612 and operatively interconnect outer side wall portion 614 and inner side wall portion 618. Connecting walls 622 are shown is being disposed in peripherally spaced relation to one another. Additionally, end member wall 606 can, optionally, include a plurality of connecting ribs 626 that are disposed in peripherally spaced relation with one another with one of connecting ribs 626 interposed between adjacent ones of connecting walls 622. As shown in FIGS. 21, 24 and 25, connecting walls 622 can have one or more dimensions that are greater than corresponding dimensions of connecting ribs 626.

End member wall 608 can include an end wall portion 628 that is oriented transverse to axis AX and an inner side wall portion 630 that is oriented in approximate alignment with the axis. Inner side wall portion 630 includes a first or upper section 632 that extends from along end wall portion 628 toward a shoulder section 634. A second or lower section 636 of inner side wall portion 630 extends from along shoulder section 634 toward an end wall portion 638. Second section 636 is disposed radially outward of first section 632. As such, shoulder section 634 extends radially between and operatively interconnects the first and second sections of inner side wall portion 630. Shoulder section 634 is oriented at an acute, included angle relative to axis AX, as is represented in FIG. 17 by reference dimension AG1. As such, it will be recognized and appreciated that first and second sections 632 and 636 of inner side wall portion 630 vary in relation to one another as the sections extend about axis AX.

A mounting wall portion 640 extends radially inward from second section 636 adjacent end wall portion 638. Mounting wall portion 640 is preferably dimensioned to receive and retain mounting bead 210 of flexible spring member 200', as identified in FIG. 17. In some cases, end member wall 608 can include a plurality of slots or grooves 642 that extend axially inward between end wall portion 638 and mounting wall portion 640. In a preferred arrangement, slots 642 are of an approximately common size and shape relative to one another, and are disposed in peripherally-spaced relation to one another about axis AX. An outer side wall portion 644 can extend axially from along end wall portion 638 toward a distal edge 646. Outer side wall portion 644 is spaced radially outward from inner side wall portion 630 such that a space or gap is formed therebetween. In some cases, outer side wall portion 644 can be laterally offset or otherwise eccentrically positioned relative to axis AX and inner side wall portion 630. In such cases, the space or gap between inner and outer side wall portions 630 and 644 will vary with position around axis AX. A support side wall 648 can extend from along end wall portion 628 in a direction away from end wall portion 638 to a distal edge 650. A plurality of connector wall portions 652 can operatively connect inner and outer side wall portions 630 and 644. Additionally, connector wall portions 652 can extend along an outer surface 654 of end wall portion 628 and operative engage support side wall 648.

In an assembled condition of end member 600, end member walls 606 and 608 at least partially define end member chamber 610 therebetween. It will be appreciated that end member walls 606 and 608 can be secured together in any suitable manner, such as by way of a flowed material joint 656, for example. It will be appreciated, however, that other configurations and/or arrangements could alternately be used. Additionally, one or more openings or passages 658 (FIG. 17) can extend through one or more of the wall portions of end member wall 608 such that end member chamber 610 and spring chamber 202 are disposed in fluid communication with one another.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A clamping plate dimensioned to secure an associated flexible spring member to an associated end member for forming an associated gas spring assembly, said clamping plate comprising:
a clamping plate wall having a longitudinal axis and extending radially outward from along said longitudinal axis, said clamping plate wall including:
a first end surface portion disposed along a first side of said clamping plate;
a second end surface portion disposed along a second side of said clamping plate that is spaced longitudinally from said first side and facing opposite said first end surface portion;
an outer peripheral surface portion extending between and operatively connecting said first and second end surface portions, said outer peripheral surface portion defining an outermost cross-sectional dimension of said clamping plate, and said outer peripheral surface portion dimensioned to abuttingly engage the associated flexible spring member for urging at least the associated flexible spring member into a substantially fluid-tight seal with the associated end member for forming the associated gas spring assembly;
a first opening extending into said clamping plate wall and being fluidically accessible from along said first end surface portion;
a second opening extending into said clamping plate wall and being fluidically accessible from along said second end surface portion; and,
a passage surface portion at least partially forming an elongated damping passage extending through said clamping plate wall with said elongated damping passage at least partially formed as an open channel that is accessible from along said second side of said clamping plate, said elongated damping passage extending in a spiral configuration through said clamping plate wall in fluid communication between said first and second openings such that said elongated damping passage has an overall length substantially greater than said outermost cross-sectional dimension of said clamping plate.

2. A clamping plate according to claim 1, wherein said outer peripheral surface portion includes an annular recess formed therealong.

3. A clamping plate according to claim 1, wherein said clamping plate wall includes a central opening extending therethrough between said first and second sides of said clamping plate, said central opening dimensioned to receive an associated securement device for attaching said clamping plate to the associated end member.

4. A clamping plate according to claim 1, wherein said clamping plate wall includes an indexing feature projecting outwardly from along said second end surface portion, said indexing feature dimensioned to cooperatively engage an associated indexing featured disposed on the associated end member.

5. A clamping plate according to claim 4, wherein said indexing feature is disposed in a predetermined angular orientation about said longitudinal axis relative to at least one of said first and second openings.

6. A gas spring assembly comprising:
a flexible spring member having a longitudinal axis and extending between opposing first and second ends, said flexible spring member including a flexible wall extending peripherally about said longitudinal axis to at least partially define a spring chamber;
a first end member including at least one end member wall that at least partially defines a first end member chamber with an opening extending through said at least one end member wall such that said spring chamber and said first end member chamber can fluidically communicate with one another through said opening; and,
a clamping plate having an outermost cross-sectional dimension and including a clamping plate wall that includes a first surface portion disposed along a first side of said clamping plate and a second surface portion disposed along a second side of said clamping plate that is opposite said first side of said clamping plate such that said second surface portion faces opposite said first surface portion, said clamping plate wall including a first opening accessible from along said first surface portion and a second opening accessible from along said second surface portion, said clamping plate including an elongated damping passage extending at least partially within said clamping plate wall, said elongated damping passage having a spiral configuration at least partially defined by a cross-sectional passage profile oriented transverse to said longitudinal axis with said cross-sectional passage profile spaced progressively radially outward from said longitudinal axis as said cross-sectional passage profile rotates substantially-continuously about said axis, said elongated damping passage disposed in fluid communication with said first and second openings such that said elongated damping passage has an overall length substantially greater than said outermost cross-sectional dimension of said clamping plate;

said clamping plate oriented such that said first side is disposed toward said spring chamber and said second side is disposed toward said first end member, said clamping plate operatively engaged with said first end of said flexible spring member and secured to said first end member such that a substantially fluid-tight seal is formed between at least said flexible spring member and said first end member with said first opening of said clamping plate disposed in fluid communication with said spring chamber and said second opening of said clamping plate disposed in fluid communication with said first end member chamber through said opening in said at least one end member wall such that gas transfer between said spring chamber and said first end member chamber through said elongated damping passage generates pressurized gas damping during use of said gas spring assembly.

7. A gas spring assembly according to claim 6, wherein said clamping plate wall includes an outer peripheral surface portion with an annular recess formed therealong that is dimensioned to abuttingly engage a portion of said first end of said flexible spring member.

8. A gas spring assembly according to claim 6, wherein said clamping plate forms a substantially fluid-tight seal with said first end of said flexible spring member.

9. A gas spring assembly according to claim 6, wherein said clamping plate is permanently attached to said first end of said flexible spring member.

10. A gas spring assembly according to claim 6, wherein said clamping plate is removably secured in abutting engagement with said first end of said flexible spring member.

11. A gas spring assembly according to claim 6, wherein said clamping plate wall includes a central opening extending therethrough between said first and second sides of said clamping plate, said central opening dimensioned to receive a securement device attaching said clamping plate to said first end member.

12. A gas spring assembly according to claim 6, wherein said first end member includes an end member indexing feature and said clamping plate includes a clamping plate indexing feature that is cooperative with said end member indexing feature such that upon engagement of said end member indexing feature with said clamping plate indexing feature said second opening of said clamping plate is disposed in fluid communication with said opening in said at least one end member wall of said first end member.

13. A gas spring assembly according to claim 12, wherein said end member indexing feature includes one of an opening in said at least one end member wall and a projection extending out of said at least one end member wall, and said clamping plate indexing feature includes a corresponding one of a projection extending from along said second surface portion of said clamping plate wall and a recess form into said clamping plate wall.

14. A gas spring assembly according to claim 12, wherein said clamping plate indexing feature is disposed in a predetermined angular orientation about said longitudinal axis relative to at least one of said first and second openings in said clamping plate wall.

15. A gas spring assembly according to claim 6, wherein said cross-sectional passage profile has an approximately U-shaped cross-sectional configuration such that said elongated damping passage is at least partially formed as an open channel that is accessible from along said second side of said clamping plate.

16. A gas spring assembly according to claim 15, wherein a substantially fluid-tight seal formed between said second surface portion of said clamping plate wall and said at least one end member wall to substantially enclose said elongated damping passage between said first and second openings of said clamping plate.

17. A gas spring assembly according to claim 6 further comprising a second end member connected across said second end of said flexible spring member such that a substantially fluid tight seal is formed therebetween, said second end member including a second end member wall that at least partially defines a second end member chamber, said second end member wall including an opening extending therethrough such that said spring chamber and said second end member chamber are disposed in fluid communication with one another.

18. A gas spring assembly comprising:
a flexible spring member having a longitudinal axis and extending between opposing first and second ends, said flexible spring member including a flexible wall extending peripherally about said longitudinal axis to at least partially define a spring chamber;
a first end member including at least one end member wall that at least partially defines a first end member chamber with an opening extending through said at least one end member wall such that said spring chamber and said first end member chamber can fluidically communicate with one another through said opening; and,
a clamping plate having an outermost cross-sectional dimension and including a clamping plate wall that includes a first surface portion disposed along a first side of said clamping plate and a second surface portion disposed along a second side of said clamping plate that is opposite said first side of said clamping plate such that said second surface portion faces opposite said first surface portion, said clamping plate wall including a first opening accessible from along said first surface portion and a second opening accessible from along said second surface portion, said clamping plate including an elongated damping passage extending at least partially within said clamping plate wall, said elongated damping passage having a spiral configuration disposed within a plane oriented transverse to said longitudinal axis, and said elongated damping passage disposed in fluid communication with said first and second openings such that said elongated damping passage has an overall length substantially greater than said outermost cross-sectional dimension of said clamping plate;
said clamping plate oriented such that said first side is disposed toward said spring chamber and said second side is disposed toward said first end member, said clamping plate operatively engaged with said first end of said flexible spring member and secured to said first end member such that a substantially fluid-tight seal is formed between at least said flexible spring member and said first end member with said first opening of said clamping plate disposed in fluid communication with said spring chamber and said second opening of said clamping plate disposed in fluid communication with said first end member chamber through said opening in said at least one end member wall such that gas transfer between said spring chamber and said first end member chamber through said elongated damping passage generates pressurized gas damping during use of said gas spring assembly.

* * * * *